United States Patent
Sato

(10) Patent No.: US 9,992,516 B2
(45) Date of Patent: Jun. 5, 2018

(54) IMAGE PROCESSING DEVICE AND METHOD

(75) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 996 days.

(21) Appl. No.: 13/390,595

(22) PCT Filed: Aug. 18, 2010

(86) PCT No.: PCT/JP2010/063918
§ 371 (c)(1),
(2), (4) Date: Feb. 15, 2012

(87) PCT Pub. No.: WO2011/024684
PCT Pub. Date: Mar. 3, 2011

(65) Prior Publication Data
US 2012/0141037 A1    Jun. 7, 2012

(30) Foreign Application Priority Data

Aug. 26, 2009 (JP) .................................. 2009-195317

(51) Int. Cl.
G06K 9/62        (2006.01)
H04N 19/82       (2014.01)
(Continued)

(52) U.S. Cl.
CPC ........... H04N 19/82 (2014.11); H04N 19/117 (2014.11); H04N 19/122 (2014.11); H04N 19/14 (2014.11);
(Continued)

(58) Field of Classification Search
None
See application file for complete search history.

(56) References Cited

U.S. PATENT DOCUMENTS

2005/0207496 A1 * 9/2005 Komiya .................. 375/240.16
2008/0199090 A1 * 8/2008 Tasaka ................. H04N 19/139
                                                382/233
(Continued)

FOREIGN PATENT DOCUMENTS

CN        1846444 A    10/2006
CN      101411201 A     4/2009
(Continued)

OTHER PUBLICATIONS

Japanese Office Action dated Mar. 20, 2014 in Patent Application No. 2009-195317.
(Continued)

*Primary Examiner* — Fred Hu
(74) *Attorney, Agent, or Firm* — Oblon, McClelland, Maier & Neustadt, L.L.P.

(57) ABSTRACT

The present invention relates to an image processing device and method capable of suppressing deterioration in encoding efficiency.
A decoded pixel classifying unit 152 and input pixel classifying unit 153 perform class classification of each of the macroblocks of a decoded image or input image, based on orthogonal transform sizes read out from an orthogonal transform size buffer 151. A 4×4 block coefficient calculating unit 154 and 8×8 block coefficient calculating unit 155 calculate filter coefficients in each orthogonal transform block such that residual is the smallest. A pixel classifying unit 161 of a loop filter 113 performs class classification of each of the macroblocks of the decoded image for each of the orthogonal transform block sizes. A filter unit (4×4) 162 and filter unit (8×8) 163 apply appropriate filter coefficients to their respectively corresponding orthogonal transform blocks, and perform filter processing. The present invention can be applied to, for example, an image processing device.

20 Claims, 24 Drawing Sheets

(51) Int. Cl.
- *H04N 19/159* (2014.01)
- *H04N 19/176* (2014.01)
- *H04N 19/70* (2014.01)
- *H04N 19/61* (2014.01)
- *H04N 19/117* (2014.01)
- *H04N 19/14* (2014.01)
- *H04N 19/122* (2014.01)
- *H04N 19/60* (2014.01)

(52) U.S. Cl.
CPC ......... *H04N 19/159* (2014.11); *H04N 19/176* (2014.11); *H04N 19/60* (2014.11); *H04N 19/61* (2014.11); *H04N 19/70* (2014.11)

(56) References Cited

U.S. PATENT DOCUMENTS

| | | | | |
|---|---|---|---|---|
| 2010/0303149 | A1* | 12/2010 | Yasuda | H04N 19/176 375/240.03 |
| 2011/0096829 | A1* | 4/2011 | Han | 375/240.02 |

FOREIGN PATENT DOCUMENTS

| | | | |
|---|---|---|---|
| CN | 101926177 A | | 12/2010 |
| EP | 2 252 063 A1 | | 11/2010 |
| JP | 7-143483 A | * | 6/1995 |
| JP | 2004-7337 | | 1/2004 |
| JP | 2006-211152 A | | 8/2006 |
| JP | 2007 110568 | | 4/2007 |
| JP | 2007-110568 | | 4/2007 |
| JP | 2007110568 A | * | 4/2007 |
| JP | WO 2009/1105559 A1 | | 9/2009 |
| JP | 2010-81368 A | | 4/2010 |
| JP | 2010081368 A | * | 4/2010 |
| WO | WO 2007/111292 A1 | | 10/2007 |
| WO | 2008 010929 | | 1/2008 |
| WO | 2008 075247 | | 6/2008 |
| WO | WO 2008075247 A1 | * | 6/2008 |
| WO | WO 2009/110559 A1 | | 9/2009 |

OTHER PUBLICATIONS

U.S. Appl. No. 13/516,856, filed Jun. 18, 2012, Sato.
U.S. Appl. No. 13/519,919, filed Jun. 29, 2012, Sato.
Chujoh, T., et al., "Adaptive Loop Filter for Improving Coding Efficiency," International Telecommunication Union, Telecommunication Standardization Sector, COM 16-C 402-E, Total 3 Pages, (Apr. 2008).
Chujoh, T., et al., "Block-based Adaptive Loop Filter," ITU—Telecommunications Standardization Sector, Study Group 16 Question 6, Video Coding Experts Group (VCEG), 35$^{th}$ Meeting: Berlin, Germany, Total 6 Pages, (Jul. 16-18, 2008).
Chenn, P., et al., "Video Coding Using Extended Block Sizes," International Telecommunication Union, Telecommunication Standardization Sector, COM 16-C 123-E, Total 4 Pages, (Jan. 2009).
International Search Report dated Nov. 2, 2010 in PCT/JP10/063918 Filed Aug. 18, 2010.
Office Action dated Nov. 21, 2013, in Japanese Patent Application No. 2009-195317.
Extended European Search Report dated Jul. 13, 2015 in Patent Application No. 10811734.2.
Korean Intellectual Property Office Notice of Preliminary Rejection, issued in Patent Application No. 10-2012-7004293, dated Jan. 25, 2016. With English translation. (7 pages).
Office Action dated Jul. 15, 2016 in Korean Patent Application No. 10-2012-7004293 (with English translation).
Office Action dated Apr. 14, 2017 in Chinese Application No. 201510023106.8 (w/English translation).
Office Action dated May 9, 2017 in Chinese Application No. 201510025568.3 (w/English translation).
Korean Office Action dated Dec. 15, 2017 in Korean Application No. 10-2017-7027840 (with English Translation), 8 pages.
Chinese Office Action dated Dec. 25, 2017 in Chinese Application No. 201510025568.3 (with English Translation), 56 pages.

* cited by examiner

FIG. 6

| | |
|---|---|
| ONE OF p OR q BELONGS TO AN INTRA MACRO BLOCK, AND ALSO IS SITUATED AT A BOUNDARY OF THE MACRO BLOCK. | Bs = 4 (Strongest Filtering) |
| ONE OF p OR q BELONGS TO AN INTRA MACRO BLOCK, BUT IS NOT SITUATED AT A BOUNDARY OF THE MACRO BLOCK. | Bs = 3 |
| NEITHER p NOR q BELONGS TO AN INTRA MACRO BLOCK, AND ALSO ONE HAS A TRANSFORM COEFFICIENT | Bs = 2 |
| NEITHER p NOR q BELONGS TO AN INTRA MACRO BLOCK, NOR DOES EITHER HAVE A TRANSFORM COEFFICIENT; BUT THE REFERENCE FRAMES DIFFER, OR THE NUMBER OF REFERENCE FRAMES DIFFER, OR THE mv VALUE DIFFERS. | Bs = 1 |
| NEITHER p NOR q BELONGS TO AN INTRA MACRO BLOCK, NOR DOES EITHER HAVE A TRANSFORM COEFFICIENT, AND THE REFERENCE FRAMES AND mv VALUE ARE THE SAME. | Bs = 0 (No Filtering) |

FIG. 7

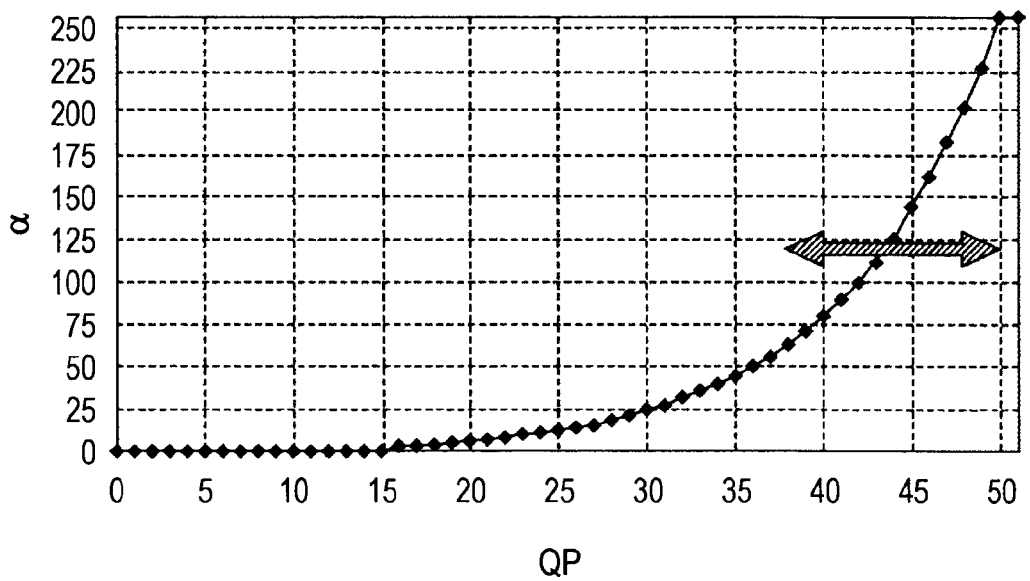

| indexA (for α) or indexB (for β) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| α | 0 | 0 | 0 | 0 | 0 | 0 | 0 | 0 | 0 | 0 | 0 | 0 | 0 | 0 | 0 | 0 | 4 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 3 | 4 | 4 | 4 |

B

| indexA (for α) or indexB (for β) | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

FIG. 9

| indexA | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| bs=1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| bs=2 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |
| bs=3 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |

A

| indexA | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| bs=1 | 1 | 1 | 1 | 1 | 1 | 1 | 1 | 2 | 2 | 2 | 2 | 3 | 3 | 3 | 4 | 4 | 4 | 5 | 6 | 6 | 7 | 8 | 9 | 10 | 11 | 13 |
| bs=2 | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| bs=3 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

B

IMAGE PROCESSING DEVICE AND METHOD

TECHNICAL FIELD

The present invention relates to an image processing device and method, and specifically relates to an image processing device and method which enable suppression in deterioration in image quality due to encoding and decoding an image, thereby further improving the image quality of decoded images.

BACKGROUND ART

In recent years, there have come into widespread use devices, compliant to formats such as MPEG (Moving Picture Experts Group) or the like, which handle image information as digital signals, and take advantage of redundancy peculiar to the image information in order to perform highly effective information transmission and storage at that time, to compress the image by orthogonal transform such as discrete cosine transform or the like and motion compensation, as both information distribution such as broadcasting and information reception in general households.

In particular, MPEG2 (ISO (International Organization for Standardization)/IEC (International Electrotechnical Commission) 13818-2) is defined as a general-purpose image encoding format, and is a standard encompassing both of interlaced scanning images and sequential-scanning images, and standard resolution images and high definition images. For example, MPEG2 has widely been employed now by broad range of applications for professional usage and for consumer usage. By employing the MPEG2 compression format, a code amount (bit rate) of 4 through 8 Mbps is allocated in the event of an interlaced scanning image of standard resolution having 720×480 pixels, for example. Also, by employing the MPEG2 compression format, a code amount (bit rate) of 18 through 22 Mbps is allocated in the event of an interlaced scanning image of high resolution having 1920×1088 pixels, for example, whereby a high compression rate and excellent image quality can be realized.

With MPEG2, high image quality encoding adapted to broadcasting usage is principally taken as a object, but a lower code amount (bit rate) than the code amount of MPEG1, i.e., an encoding format having a higher compression rate is not handled. According to spread of personal digital assistants, it has been expected that needs for such an encoding format will be increased from now on, and in response to this, standardization of the MPEG4 encoding format has been performed. With regard to an image encoding format, the specification thereof was confirmed as international standard as ISO/IEC 14496-2 in December in 1998.

Further, in recent years, standardization of a standard called H.26L (ITU-T (ITU Telecommunication Standardization Sector) Q6/16 VCEG (Video Coding Experts Group)) has progressed, originally intended for image encoding for videoconferencing usage. With H.26L, it has been known that as compared to a conventional encoding format such as MPEG2 or MPEG4, though greater computation amount is requested for encoding and decoding thereof, higher encoding efficiency is realized. Also, currently, as part of activity of MPEG4, standardization for also taking advantage of functions not supported by H.26L with this H.26L taken as a base, to realize higher encoding efficiency, has been performed as Joint Model of Enhanced-Compression Video Coding. As a schedule of standardization, H.264 and MPEG-4 Part10 (AVC (Advanced Video Coding)) become an international standard in March, 2003.

Further, as an extension thereof, FRExt (Fidelity Range Extension) including a coding tool necessary for business use such as RGB, 4:2:2, or 4:4:4, 8×8DCT (Discrete Cosine Transform) and quantization matrix stipulated by MPEG-2 has been standardized, whereby AVC can be used as an encoding format capable of suitably expressing even film noise included in movies, and has come to be employed for wide ranging applications such as Blu-Ray Disc (registered trademark) and so forth.

However, nowadays, needs for further high-compression encoding have been increased, such as intending to compress an image having around 4000×2000 pixels, which is quadruple of a high-vision image, or alternatively, needs for further high-compression encoding have been increased, such as intending to distribute a high-vision image within an environment with limited transmission capacity like the Internet. Therefore, with the above-mentioned VCEG under the control of ITU-T, studies relating to improvement of encoding efficiency have continuously been performed.

Also, there is adaptive loop filter (ALF (Adaptive Loop Filter)) as a next generation video encoding technique which is being considered as of recent (see NPL 1 and NPL 2 for example). According to this adaptive loop filter, optimal filter processing is performed each frame, and block noise which was not completely removed at the deblocking filter, and noise due to quantization, can be reduced.

Now, the macro block size of 16×16 pixels is not optimal for large image frames such as UHD (Ultra High Definition; 4000×2000 pixels) which will be handled by next-generation encoding methods. There has been proposed enlarging the macroblock size to a size of such as 32×32 pixels or 64×64 pixels, for example (NPL 3 for example).

CITATION LIST

Non Patent Literature

NPL 1: Yi-Jen Chiu and L. Xu, "Adaptive (Wiener) Filter for Video Compression," ITU-T SG16 Contribution, C437, Geneva, April 2008.

NPL 2: Takeshi. Chujoh, et al., "Block-based Adaptive Loop Filter" ITU-T SG16 Q6 VCEG Contribution, AI18, Germany, July, 2008

NPL 3: Qualcomm Inc, "Video Coding Using Extended Block Sizes" ITU-T SG16 Contribution, C123, English, January 2009.

SUMMARY OF INVENTION

Technical Problem

Generally, images generally have various features locally, so optimal filter coefficients are locally different. For example, with the AVC encoding format, there is observed different image quality deterioration between a case where the orthogonal transform size is 4×4 and a case of 8×8. For example, with 8×8 orthogonal transform blocks, there is observed mosquito noise which is not observed with 4×4 orthogonal transform blocks. Also, there is the tendency that 8×8 orthogonal transform blocks are readily selected for flat areas but 4×4 orthogonal transform blocks are readily selected for areas with fine texture.

However, with the conventionally-proposed method, the same filter coefficient is just uniformly applied to the entire image, so noise removal suitable for local nature which the image has is not necessarily performed, and there has been concern that the image quality of the decoded image may deteriorate locally.

The present invention has been made in light of such a situation, and it is an object thereof to suppress deterioration in image quality due to encoding and decoding an image, thereby further improving the image quality of decoded images.

Solution to Problem

One aspect of the present invention is an image processing device including: classifying means configured to classify an image by orthogonal transform sizes applied in orthogonal transform processing performed as to the image, for each predetermined image size; and filter means configured to perform filter processing for noise removal on each partial image of each the image size classified by the classifying means, using filter coefficients set in accordance with local nature of the image corresponding to the orthogonal transform size of the partial image.

The filter means may be a Wiener Filter.

The image size may be a macroblock, with the classifying means classifying the macroblocks by the orthogonal transform sizes thereof, and the filter means performing the filter processing as to each macroblock classified by the classifying means, using the filter coefficients set in accordance with local nature of the image corresponding to the orthogonal transform size thereof.

The image processing device may further include encoding means configured to encode the image, and generate encoded data.

The encoding means may perform encoding of the image with the AVC (Advanced Video Coding) format, with the classifying means classifying, by the image size, a decoded image subjected to orthogonal transform, quantization, inverse quantization, and inverse orthogonal transform, by the encoding means, and with the filter means performing the filter processing as to the partial image of the decoded image and store filter processing results in frame memory as a reference image.

The image processing device may further include filter coefficient calculating means configured to calculate the filter coefficients using an input image to the encoding means and the decoded image, with the filter means performing the filter processing using the filter coefficient calculated by the filter coefficient calculating means.

The filter coefficient calculating means may classify the input image and the decoded image each by orthogonal transform sizes applied in orthogonal transform processing performed by the encoding means, for each of the image sizes, and calculate the filter coefficient such that the residual between the input image and the decoded image is the smallest, for each orthogonal transform size.

The filter coefficient calculating means may set the values of the filter coefficients in accordance with local nature of the image corresponding to the orthogonal transform size applied in orthogonal transform processing performed by the encoding means.

The filter coefficient calculating means may further set the number of taps of the filter coefficients in accordance with local nature of the image corresponding to the orthogonal transform size applied in orthogonal transform processing performed by the encoding means.

The filter coefficient calculating means may set the number of taps longer for the filter coefficients the greater the orthogonal transform size is, and set the number of taps shorter for the filter coefficients the smaller the orthogonal transform size is.

The image processing device may further include adding means configured to add the filter coefficient to the encoded data generated by the encoding means.

The adding means may further add flag information for controlling whether or not to perform the filter processing, to the encoded data.

The image processing device may further include: extracting means configured to extract the filter coefficient from encoded data of an image having been encoded; and decoding means configured to decode the encoded data and generate a decoded image; with the classifying means classifying the decoded image generated by the decoding means by the orthogonal transform size, for each of the image sizes; and with the filter means performing filter processing for noise removal on each partial image of each the image size classified by the classifying means, using the filter coefficients extracted by the extracting means.

The decoding means may perform encoding of the encoded data with the AVC (Advanced Video Coding) format, with the classifying means classifying, by the image size, the decoded image subjected to decoding, inverse quantization, and inverse orthogonal transform, by the decoding means, and with the filter means performing the filter processing as to the partial image of the decoded image.

One aspect of the present invention is also an image processing method, wherein classifying means of an image processing device classify an image by orthogonal transform sizes applied in orthogonal transform processing performed as to the image, for each predetermined image size, and filter means of the image processing device perform filter processing for noise removal on each partial image of each the image size that has been classified, using filter coefficients set in accordance with local nature of the image corresponding to the orthogonal transform size of the partial image.

With one aspect of the present invention, an image is classified by orthogonal transform sizes applied in orthogonal transform processing performed as to the image, for each predetermined image size, and filter processing is performed for noise removal on each partial image of each the image size that has been classified, using filter coefficients set in accordance with local nature of the image corresponding to the orthogonal transform size of the partial image.

Advantageous Effects of Invention

According to the present invention, images can be encoded or decoded. Particularly, deterioration of image quality due to encoding and decoding images can be suppressed, and image quality of decoded images can be improved.

BRIEF DESCRIPTION OF DRAWINGS

FIG. 6 is a diagram for describing a method of defining Bs.

FIG. 7 is a diagram for describing an operating principle of a deblocking filter.

FIG. 8 is an diagram illustrating an example of correlation between indexA and indexB, and the values of α and β.

FIG. 9 is an diagram illustrating an example of correlation between Bs, indexA, and $t_{CO}$.

DESCRIPTION OF EMBODIMENTS

Hereinafter, embodiments of the present invention will be described. Note that description will proceed in the following order.

1. First Embodiment (image encoding device)
2. Second Embodiment (image decoding device)
3. Third Embodiment (ALF block control)
4. Fourth Embodiment (QALF)
5. Fifth Embodiment (personal computer)
6. Sixth Embodiment (television receiver)
7. Seventh Embodiment (cellular telephone)
8. Eighth Embodiment (hard disk recorder)
9. Ninth Embodiment (camera)

First Embodiment

[Configuration of Device]

Figure 1:
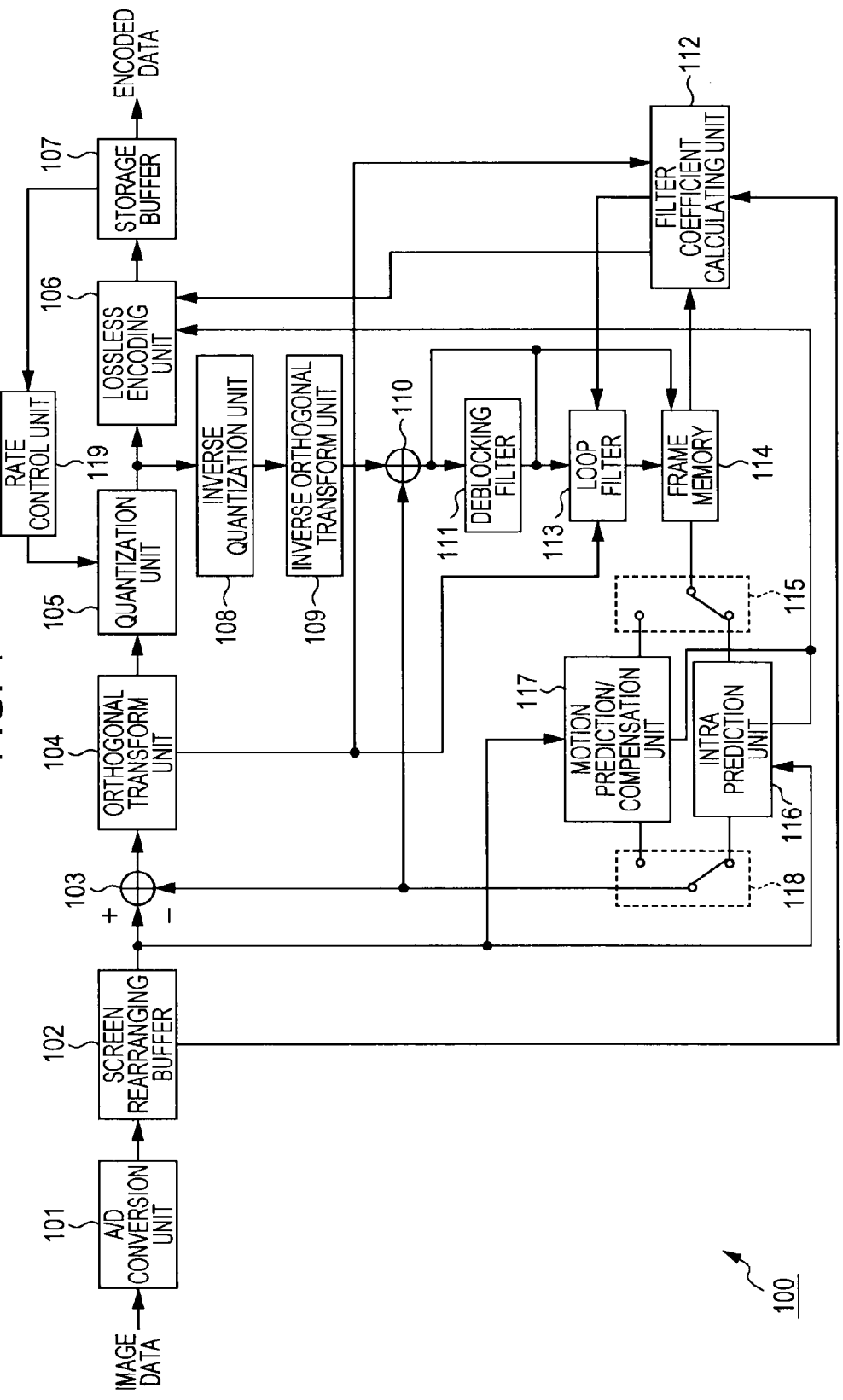
FIG. 1 is a block diagram illustrating the configuration of an embodiment of an image encoding device to which the present invention has been applied.

FIG. 1 represents the configuration of an embodiment of an image encoding device serving as an image processing device to which the present invention has been applied.

An image encoding device 100 shown in FIG. 1 is an image encoding device which subjects an image to compression encoding using, for example, the H.264 and MPEG (Moving Picture Experts Group) 4 Part10 (AVC (Advanced Video Coding)) (hereafter, written as H.264/AVC) format, and further employs an adaptive loop filter.

With the example in FIG. 1, the image encoding device 100 has an A/D (Analog/Digital) conversion unit 101, a screen rearranging buffer 102, a computing unit 103, an orthogonal transform unit 104, a quantization unit 105, a lossless encoding unit 106, and a storing buffer 107. The image encoding device 100 also has an inverse quantization unit 108, an inverse orthogonal transform unit 109, a computing unit 110, and a deblocking filter 111. Further, the image encoding device 100 has a filter coefficient calculating unit 112, an loop filter 113, and frame memory 114. Also, the image encoding device 100 has a selecting unit 115, an intra prediction unit 116, a motion prediction/compensation unit 117, and a selecting unit 118. Further, the image encoding device 100 has a rate control unit 119.

The A/D conversion unit 101 performs A/D conversion of input image data, and outputs to the screen rearranging buffer 102 and stores. The screen rearranging buffer 102 rearranges the images of frames in the stored order for display into the order of frames for encoding according to GOP (Group of Picture) structure. The screen rearranging buffer 102 supplies the images of which the frame order has been rearranged to the computing unit 103, intra prediction unit 116, motion prediction/compensation unit 117, and filter coefficient calculating unit 112.

The computing unit 103 subtracts, from the image read out from the screen rearranging buffer 102, the prediction image supplied from the selecting unit 118, and outputs difference information thereof to the orthogonal transform unit 104. For example, in the case of an image regarding which intra encoding has performed, the computing unit 103 adds the prediction image supplied from the intra prediction unit 116 to the image read out from the screen rearranging buffer 102. Also, for example, in the case of inter encoding having been performed, the computing unit 103 adds the prediction image supplied from the motion prediction/compensation unit 117 to the image read out from the screen rearranging buffer 102.

The orthogonal transform unit 104 subjects the difference information from the computing unit 103 to orthogonal transform, such as discrete cosine transform, Karhunen-Loéve transform, or the like, and supplies a transform coefficient thereof to the quantization unit 105. The orthogonal transform unit 104 also supplies information relating to which of 4×4 orthogonal transform and 8×8 orthogonal transform has been applied to each macroblock (orthogonal transform size) to the filter coefficient calculating unit 112 and loop filter 113.

The quantization unit 105 quantizes the transform coefficient that the orthogonal transform unit 104 outputs. The quantization unit 105 supplies the quantized transform coefficient to the lossless encoding unit 106.

The lossless encoding unit 106 subjects the quantized transform coefficient to lossless encoding, such as variable length coding, arithmetic coding, or the like.

The lossless encoding unit 106 obtains information indicating intra prediction and so forth from the intra prediction unit 116, and obtains information indicating an inter prediction mode, and so forth from the motion prediction/compensation unit 117. Note that the information indicating intra prediction will also be referred to as intra prediction mode information hereinafter. Also, the information indicating information mode indicating inter prediction will also be referred to as inter prediction mode information hereinafter.

The lossless encoding unit 106 further obtains filter coefficients used at the loop filter 113 from the filter coefficient calculating unit 112.

The lossless encoding unit 106 encodes the quantized transform coefficient, and also takes filter coefficients, intra prediction mode information, inter prediction mode information, quantization parameters, and so forth, as part of header information in the encoded data (multiplexes). The lossless encoding unit 106 supplies the encoded data obtained by encoding to the storing buffer 107 for storage.

For example, with the lossless encoding unit 106, lossless encoding processing, such as variable length coding, arithmetic coding, or the like, is performed. Examples of the variable length coding include CAVLC (Context-Adaptive Variable Length Coding) stipulated by the H.264/AVC format. Examples of the arithmetic coding include CABAC (Context-Adaptive Binary Arithmetic Coding).

The storing buffer 107 temporarily holds the encoded data supplied from the lossless encoding unit 106, and at a predetermined timing outputs this to, for example, a recording device or transmission path or the like downstream not shown in the drawing, as a compressed image encoded by the H.264/AVC format.

Also, the quantized transform coefficient output from the quantization unit 105 is also supplied to the inverse quantization unit 108. The inverse quantization unit 108 performs inverse quantization of the quantized transform coefficient with a method corresponding to quantization at the quantization unit 105, and supplies the obtained transform coefficient to the inverse orthogonal transform unit 109.

The inverse orthogonal transform unit 109 performs inverse orthogonal transform of the supplied transform coefficients with a method corresponding to the orthogonal transform processing by the orthogonal transform unit 104. The output subjected to inverse orthogonal transform is supplied to the computing unit 110.

The computing unit 110 adds the inverse orthogonal transform result supplied from the inverse orthogonal transform unit 109, i.e., the restored difference information, to the prediction image supplied from the selecting unit 118, and obtains a locally decoded image (decoded image). In the event that the difference information corresponds to an image regarding which intra encoding is to be performed, for example, the computing unit 110 adds the prediction image supplied from the intra prediction unit 116 to that difference information. Also, in the event that the difference information corresponds to an image regarding which inter encoding is to be performed, for example, the computing unit 110 adds the prediction image supplied from the motion prediction/compensation unit 117 to that difference information.

The addition results thereof are supplied to the deblocking filter 111.

The deblocking filter 111 removes block noise from the decoded image. The deblocking filter 111 then supplies the noise removal results to the loop filter 113 and the frame memory 114.

The filter coefficient calculating unit 112 is supplied with the decoded image supplied from the deblocking filter 111 via the frame memory 114. The filter coefficient calculating unit 112 is further supplied with the input image read out from the screen rearranging buffer 102. Further, the filter coefficient calculating unit 112 is supplied with, from the orthogonal transform unit 104, the orthogonal transform size (which of 4×4 orthogonal transform and 8×8 orthogonal transform has been applied to each macroblock).

Based on the orthogonal transform size supplied from the orthogonal transform unit 104, the filter coefficient calculating unit 112 groups the macroblocks of the decoded image and input image by orthogonal transform size (performs class classification), and generates an appropriate filter coefficient for filter processing performed at the loop filter 113, for each group (class). The filter coefficient calculating unit 112 calculates the filter coefficients so that the residual (difference between the decoded image and the input image) is minimal in each group (orthogonal transform size).

The filter coefficient calculating unit 112 supplies the filter coefficients of each group generated to the loop filter 113. Also, the filter coefficient calculating unit 112 supplies the filter coefficients of each group generated to the lossless encoding unit 106. As described above, the filter coefficients are included in the encoded data (multiplexed) by the lossless encoding unit 106. that is to say, the filter coefficients of each group is sent to the image decoding device along with the encoded data.

Decoded images supplied from the deblocking filter 111 via the frame memory 114 are supplied to the loop filter 113. Also, the filter coefficient calculating unit 112 is supplied from the orthogonal transform unit 104 with the orthogonal transform size (information relating to which of 4×4 orthogonal transform and 8×8 orthogonal transform has been applied to each macroblock).

The loop filter 113 groups (performs class classification) of the macroblocks of the decoded image by orthogonal transform size, based on the orthogonal transform size supplied from the orthogonal transform unit 104, and performs filter processing on the decoded image using the filter coefficients supplied from the filter coefficient calculating unit 112, for each group (class). A Wiener filter (Wiener Filter), for example, is used as this filter. Of course, a filer other than a Wiener filter may be used. The loop filter 113 supplies the filter processing results to the frame memory 114, and stores as a reference image.

The frame memory 114 outputs the stored reference image to the intra encoding unit 116 or the motion prediction/compensation unit 117 via the selecting unit 115 at a predetermined timing. For example, in the case of an image regarding which intra encoding is to be performed, for example, the frame memory 114 supplies the reference image to the intra prediction unit 116 via the selecting unit 115. Also, in the case of an image regarding which inter encoding is to be performed, for example, the frame memory 114 supplies the reference image to the motion prediction/compensation unit 117 via the selecting unit 115.

With this image encoding device 100, the I picture, B picture, and P picture from the screen rearranging buffer 102 are supplied to the intra prediction unit 116 as an image to be subjected to intra prediction (also referred to as intra processing), for example. Also, the B picture and P picture read out from the screen rearranging buffer 102 are supplied to the motion prediction/compensation unit 117 as an image to be subjected to inter prediction (also referred to as inter processing).

The selecting unit 115 supplies the reference image supplied from the frame memory 114 to the intra prediction unit 116 in the case of an image regarding which intra encoding is to be performed, and supplies to the motion prediction/compensation unit 117 in the case of an image regarding which inter encoding is to be performed.

The intra prediction unit 116 performs intra prediction processing of all of the candidate intra prediction modes based on the image to be subjected to intra prediction read out from the screen rearranging buffer 102, and the reference image supplied from the frame memory 114, to generate a prediction image.

With the intra prediction unit 116, information relating to the intra prediction mode applied to the current block/macroblock is transmitted to the lossless encoding unit 106, and is taken as a part of the header information. The intra 4×4 prediction mode, intra 8×8 prediction mode, and intra 16×16 prediction mode are defined for luminance signals, and also with regard to color difference signals, a prediction mode can be defined for each macroblock, independent from the luminance signals. For the intra 4×4 prediction mode, one intra prediction mode is defined for each 4×4 luminance block. For the intra 8×8 prediction mode, one intra prediction mode is defined for each 8×8 luminance block. For the intra 16×16 prediction mode and color difference signals, one prediction mode is defined for each macroblock.

The intra prediction unit 116 calculates a cost function value as to the intra prediction mode where the prediction image has been generated, and selects the intra prediction mode where the calculated cost function value gives the minimum value, as the optimal intra prediction mode. The intra prediction unit 116 supplies the prediction image generated in the optimal intra prediction mode to the computing unit 103 via the selecting unit 118.

With regard to the image to be subjected to inter encoding, the motion prediction/compensation unit 117 uses the input image supplied from the screen rearranging buffer 102 and decoded image serving as the reference frame supplied from the frame memory 114, and calculates a motion vector. The motion prediction/compensation unit 117 performs motion compensation processing according to the calculated motion vector, and generates a prediction image (inter prediction image information)

The motion prediction/compensation unit 117 performs inter prediction processing for all candidate inter prediction modes, and generates prediction images. The inter prediction modes are the same as with the case of the intra prediction modes.

The motion prediction/compensation unit 117 calculates const function values for the inter prediction modes regarding which prediction images have been generated, and selects the inter prediction mode of which calculated cost function value yields the smallest value as the optimal inter prediction mode. The motion prediction/compensation unit 117 supplies the prediction image generated in the optimal inter prediction mode to the computing unit 103 via the selecting unit 118.

The motion prediction/compensation unit 117 supplies the motion vector information indicating the calculated motion vector to the lossless encoding unit 106. This motion vector information is included (multiplexed) in the encoded data by the lossless encoding unit 106. That is to say, the motion vector information is sent to the image decoding device along with the encoded data.

The selecting unit 118 supplies the output of the intra prediction unit 116 to the computing unit 103 in the case of an image for performing intra encoding, and supplies the output of the motion prediction/compensation unit 117 to the computing unit 103 in the case of performing inter encoding.

The rate control unit 119 controls the rate of quantization operations of the quantization unit 105 based on the compressed image stored in the storing buffer 107, such that overflow or underflow does not occur.

[Description of Orthogonal Transform]

Next, each processing described above will be described in detail. First, orthogonal transform will be described.

With the MPEG2 encoding format, processing for orthogonal transform has been performed with 8×8 pixels as an increment. On the other hand, with the image encoding device 100 which performs orthogonal transform the same as with the AVC encoding format, orthogonal transform with 4×4 pixels as an increment is performed with Baseline Profile, Main Profile, and Extended Profile. Also, in High Profile or higher, the image encoding device 100 is capable of switching between orthogonal transform in increments of 4×4 pixels shown in A in FIG. 2 and orthogonal transform in increments of 8×8 pixels shown in B in FIG. 2, in increments of macroblocks.

[4×4 Orthogonal Transform]

First, 4×4 orthogonal transform will be described. Orthogonal transform in increments of 4×4 pixels has the following features.

A first feature is that with the MPEG2 encoding format, the computing precision for transform may be set freely as to each encoding format within a certain range, so there has been the necessity to implement measures for mismatch in inverse transform, but with the present method, both transform and inverse transform are stipulated in the standard, so there is no need to implement such measures for mismatch.

A second feature is that implementation with a 16-bit register is enabled, such that the computation is realizable with low-power-consumption type digital signal processors (DSP (Digital Signal Processor)) such as used with portable terminals or the like.

A third feature is that while mosquito noise due to quantization error at high-frequency coefficients has been observed with encoding methods using orthogonal transform in increments of 8×8 pixels, such as MPEG2 and the like, such mosquito noise is not readably observed with the present method.

Figure 3:
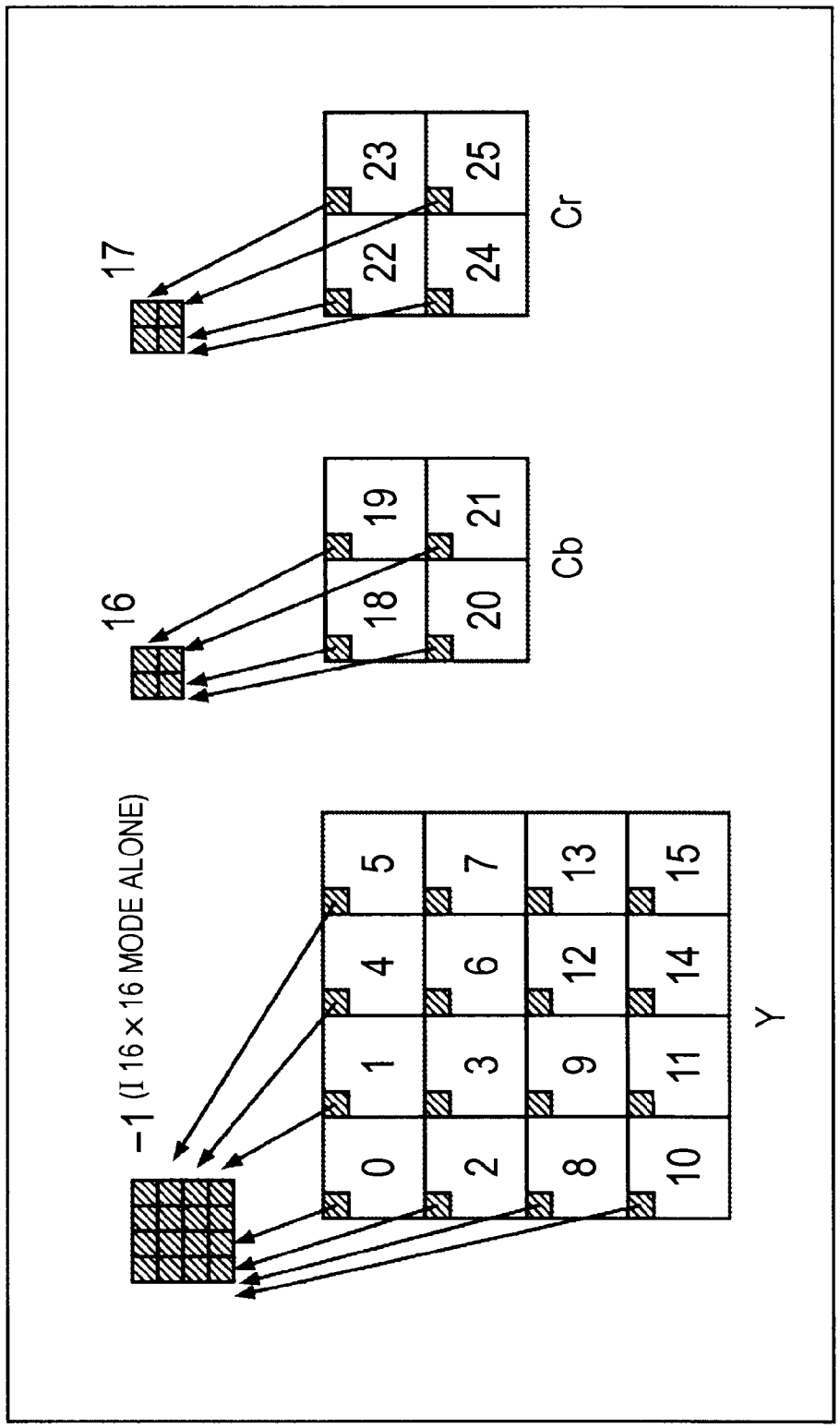
FIG. 3 is a diagram for describing processing in a macroblock where 4×4 orthogonal transform is performed.

FIG. 3 illustrates an overview of orthogonal transform and quantization processing. That is to say, 16×16 pixels of luminance signals and 8×8 pixels of color difference signals included in one macroblock are each divided into 4×4 pixel blocks as shown in FIG. 3, and each is subjected to integer transform processing and quantization processing. Further, with regard to color difference signals, as shown in FIG. 3, 2×2 matrices collecting only the DC component are generated, and these are subjected to Hadamard transform of the order 2 and quantization.

Also, in the event that the current macroblock is intra 16×16 mode, as shown in FIG. 3, 4×4 matrices collecting only the DC component are generated, and these are subjected to Hadamard transform of the order 4 and quantization.

Orthogonal transform of the order 4 can be described as in the following Expression (1).

[Mathematical Expression 1]

$$[Y] = [A][X][A]^T = \begin{bmatrix} a & a & a & a \\ b & c & -c & -b \\ a & -a & -a & a \\ c & -b & b & -c \end{bmatrix} [X] \begin{bmatrix} a & b & a & c \\ a & c & -a & -b \\ a & -c & -a & b \\ a & -b & a & -c \end{bmatrix} \quad (1)$$

where $$a = \frac{1}{2}, b = \sqrt{\frac{1}{2}} \cos\left(\frac{\pi}{8}\right), c = \sqrt{\frac{1}{2}} \cos\left(\frac{3\pi}{8}\right)$$

Expression (2) is a variant which can be made of this Expression (1).

[Mathematical Expression 2]

$$[Y] = ([C][X][C]^T) \otimes [E] = \left(\begin{bmatrix} 1 & 1 & 1 & 1 \\ 1 & d & -d & -1 \\ 1 & -1 & -1 & 1 \\ d & -1 & 1 & -d \end{bmatrix}[X]\begin{bmatrix} 1 & 1 & 1 & d \\ 1 & d & -1 & -1 \\ 1 & -d & -1 & 1 \\ 1 & -1 & 1 & -d \end{bmatrix}\right) \otimes \begin{bmatrix} a^2 & ab & a^2 & ab \\ ab & b^2 & ab & b^2 \\ a^2 & ab & a^2 & ab \\ ab & b^2 & ab & b^2 \end{bmatrix} \quad (2)$$

where $$a = \frac{1}{2}, b = \sqrt{\frac{2}{5}}, d = \frac{1}{2}$$

Expression (3) is a further variant which can be made of this Expression (2).

[Mathematical Expression 3]

$$[Y] = ([C_f][X][C_f]^T) \otimes [E_f] = \left(\begin{bmatrix} 1 & 1 & 1 & 1 \\ 2 & 1 & -1 & -2 \\ 1 & -1 & -1 & 1 \\ 1 & -2 & 2 & -1 \end{bmatrix}[X]\begin{bmatrix} 1 & 2 & 1 & 1 \\ 1 & 1 & -1 & -2 \\ 1 & -1 & -1 & 2 \\ 1 & -2 & 1 & -1 \end{bmatrix}\right) \otimes \begin{bmatrix} a^2 & ab/2 & a^2 & ab/2 \\ ab & b^2/4 & ab & b^2/4 \\ a^2 & ab/2 & a^2 & ab/2 \\ ab/2 & b^2/4 & ab/2 & b^2/4 \end{bmatrix} \quad (3)$$

Accordingly, matrix $[C_f]$ can be expressed as the following Expression (4).

[Mathematical Expression 4]

$$[C_f] = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \quad (4)$$

That is to say, the image encoding device 100 uses the matrix shown to the right-hand side in Expression (4) as an integer transform matrix.

Accordingly, integer transform can be realized by add (add-subtract) and shift (bit-shift).

Also, from Expression (3), matrix $[E_f]$ can be expressed as the following Expression (5).

[Mathematical Expression 5]

$$[E_f] = \begin{bmatrix} a^2 & ab/2 & a^2 & ab/2 \\ ab & b^2/4 & ab & b^2/4 \\ a^2 & ab/2 & a^2 & ab/2 \\ ab/2 & b^2/4 & ab/2 & b^2/4 \end{bmatrix} \quad (5)$$

The term at the right-hand side of this Expression (5) is realized by the image encoding device 100 performing different quantization processing for each 4×4 component. In to her words, the image encoding device 100 realizes orthogonal transform by combination of integer transform and quantization processing.

Also, inverse transform can be expressed as in the following Expression (6).

[Mathematical Expression 6]

$$[X'] = [C_i]^T([Y] \otimes [E_i])[C_i] = \begin{bmatrix} 1 & 1 & 1 & \frac{1}{2} \\ 1 & \frac{1}{2} & -1 & -1 \\ 1 & -\frac{1}{2} & -1 & 1 \\ 1 & -1 & 1 & -\frac{1}{2} \end{bmatrix} \quad (6)$$

$$\left([Y] \otimes \begin{bmatrix} a^2 & ab & a^2 & ab \\ ab & b^2 & ab & b^2 \\ a^2 & ab & a^2 & ab \\ ab & b^2 & ab & b^2 \end{bmatrix}\right)\begin{bmatrix} 1 & 1 & 1 & 1 \\ 1 & \frac{1}{2} & -\frac{1}{2} & -1 \\ 1 & -1 & -1 & 1 \\ \frac{1}{2} & -1 & 1 & -\frac{1}{2} \end{bmatrix}$$

Accordingly, the right-hand side of Expression (6) can be expressed as in the following Expression (7) and Expression (8).

[Mathematical Expression 7]

$$([Y] \otimes [E_i]) = \left([Y] \otimes \begin{bmatrix} a^2 & ab & a^2 & ab \\ ab & b^2 & ab & b^2 \\ a^2 & ab & a^2 & ab \\ ab & b^2 & ab & b^2 \end{bmatrix}\right) \quad (7)$$

[Mathematical Expression 8]

$$[C_i] = \begin{bmatrix} 1 & 1 & 1 & 1 \\ 1 & \frac{1}{2} & -\frac{1}{2} & -1 \\ 1 & -1 & -1 & 1 \\ \frac{1}{2} & -1 & 1 & -\frac{1}{2} \end{bmatrix} \quad (8)$$

The matrix shown to the right-hand side in Expression (7) is a 4×4 matrix obtained as the result of inverse quantization, while a 4×4 matrix as to the decoded image is calculated by applying the inverse quantization matrix shown to the right-hand side in Expression (8).

Inverse integer transform also can be realized by add (add-subtract) and shift (bit-shift) alone.

Figure 4:
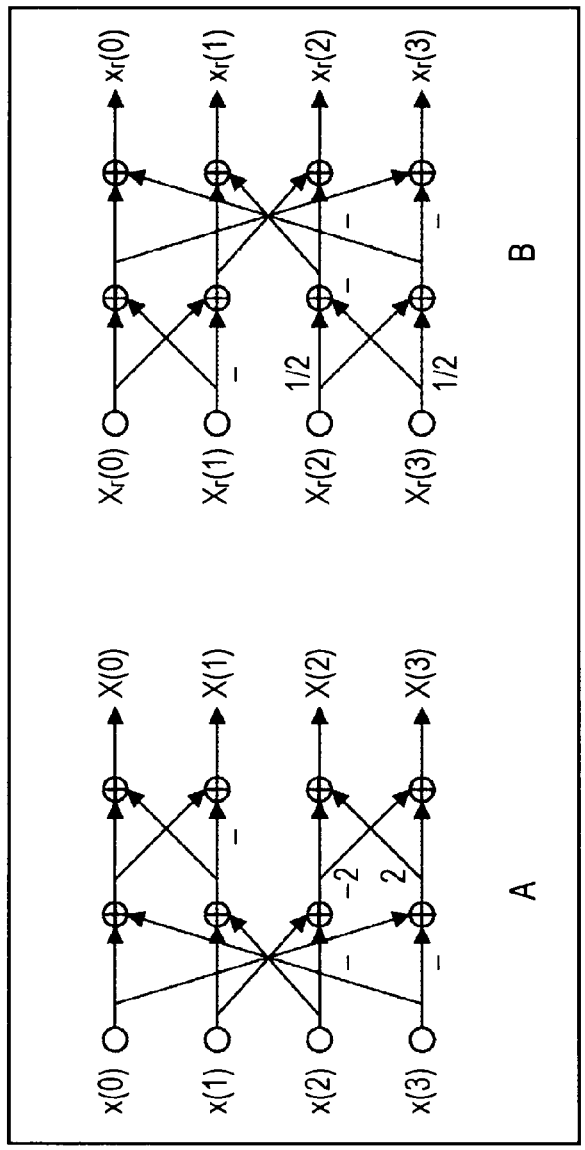
FIG. 4 is a diagram illustrating a method for realizing integer transform and inverse integer transform by butterfly computation.

A in FIG. 4 and B in FIG. 4 illustrate a technique for realizing integer transform and inverse integer transform by butterfly computation.

[8×8 Orthogonal Transform]

Next, description will be made regarding 8×8 orthogonal transform which can be used with AVC High Profile and higher.

With the image encoding device 100, 8×8 orthogonal transform is defined as integer transform realized with only add-subtract and shift computation, the same as with the case of 4×4.

First, the image encoding device 100 performs calculation of orthogonal transform for eight points in the horizontal direction, and next performs transform for eight points in the vertical direction.

To simplify description, one-dimensional integer transform of order 8 will be described.

With input signals of {d0, d1, d2, d3, d4, d5, d6, d7}, first, calculation of the following Expression (9) through Expression (16) is performed.

$$e0 = d0 + d7 \quad (9)$$

$$e1 = d1 + d6 \quad (10)$$

$$e2 = d2 + d5 \quad (11)$$

$$e3 = d3 + d6 \quad (12)$$

$$e4 = d0 - d7 \quad (13)$$

$$e5 = d1 - d6 \quad (14)$$

$$e6 = d2 - d5 \quad (15)$$

$$e7 = d3 - d4 \quad (16)$$

Next, calculation of the following Expression (17) through Expression (24) is performed for {e0, e1, e2, e3, e4, e5, e6, e7}.

$$e'0 = e0 + e3 \quad (17)$$

$$e'1 = e1 + e2 \quad (18)$$

$$e'2 = e0 - e3 \quad (19)$$

$$e'3 = e1 - e2 \quad (20)$$

$$e'4 = e5 + e6 + (e4 >> 1 + e4) \quad (21)$$

$$e'5 = e4 - e7 - (e6 >> 1 + e6) \quad (22)$$

$$e'6 = e4 + e7 - (e5 >> 1 + e5) \quad (23)$$

$$e'7 = e5 - e6 + (e7 >> 1 + e7) \quad (24)$$

Further, calculation of the following Expression (25) through Expression (32) is performed for {e'0, e'1, e'2, e'3, e'4, e'5, e'6, e'7}, obtaining orthogonally transformed coefficients {D0, D1, D2, D3, D4, D5, D6, D7}.

$$D0 = e'0 + e'1 \quad (25)$$

$$D2 = e'2 + e'3 >> 1 \quad (26)$$

$$D4 = e'0 - e'1 \quad (27)$$

$$D6 = e'2 >> 1 - e'3 \quad (28)$$

$$D1 = e'4 + e'7 >> 2 \quad (29)$$

$$D3 = e'5 + e'6 >> 2 \quad (30)$$

$$D5 = e'6 - e'5 >> 2 \quad (31)$$

$$D7 = -e'7 + e'4 >> 2 \quad (32)$$

Inverse orthogonal transform from {D0, D1, D2, D3, D4, D5, D6, D7} to {d0, d1, d2, d3, d4, d5, d6, d7} is performed as follows.

That is to say, first, from {D0, D1, D2, D3, D4, D5, D6, D7} to {f0, f1, f2, f3, f4, f5, f6, f7} is calculated as with the following Expression (34) through Expression (40).

$$f0 = D0 + D4 \quad (33)$$

$$f1 = -D3 + D5 - (D7 + D7 >> 1) \quad (34)$$

$$f2 = D0 - D4 \quad (35)$$

$$f3 = D1 + D7 - (D3 + D3 >> 1) \quad (36)$$

$$f4 = D2 >> 1 - D6 \quad (37)$$

$$f5 = -D1 + D7 + (D5 + D5 >> 1) \quad (38)$$

$$f6 = D2 + D6 >> 1 \quad (39)$$

$$f7 = D3 + D5 + (D1 + D1 >> 1) \quad (40)$$

Next, from {f0, f1, f2, f3, f4, f5, f6, f7} to {f'0, f'1, f'2, f'3, f'4, f'5, f'6, f'7} is calculated as with the following Expression (41) through Expression (48).

$$f'0 = f0 + f6 \quad (41)$$

$$f'1 = f1 + f7 >> 2 \quad (42)$$

$$f'2 = f2 + f4 \quad (43)$$

$$f'3 = f3 + f5 >> 2 \quad (44)$$

$$f'4 = f2 - f4 \quad (45)$$

$$f'5 = f3 >> 2 - f5 \quad (46)$$

$$f'6 = f0 - f6 \quad (47)$$

$$f'7 = f7 - f1 >> 2 \quad (48)$$

Finally, from {f'0, f'1, f'2, f'3, f'4, f'5, f'6, f'7} to {d0, d1, d2, d3, d4, d5, d6, d7} is calculated as with the following Expression (49) through Expression (56).

$$d0 = f'0 + f'7 \quad (49)$$

$$d1 = f'2 + f'5 \quad (50)$$

$$d2 = f'4 + f'3 \quad (51)$$

$$d3 = f'6 + f'1 \quad (52)$$

$$d4 = f'6 - f'1 \quad (53)$$

$$d5 = f'4 - f'3 \quad (54)$$

$$d6 = f'2 - f'5 \quad (55)$$

$$d7 = f'0 - f'7 \quad (56)$$

[Deblocking Filter]

Next, the deblocking filter will be described. The deblocking filter 111 removes block noise in decoded images. Accordingly, propagation of block noise to the image referenced by motion compensation processing is suppressed.

The following three methods of (a) through (c) for deblocking filter processing can be selected by the two parameters of deblocking_filter_control_present_flag included in Picture Parameter Set RBSP (Raw Byte Sequence Payload) and disable_deblocking_filter_idc included in the slice header (Slice Header), which are included in the encoded data.

(a) applied to block boundaries and macroblock boundaries (b) applied to just macroblock boundaries (c) not applied As for a quantization parameter QP, QPY is used in the case of applying the following processing to luminance signals, and QPC is used in the case of applying to color difference signals. Also, while pixel values belonging to different slices are processed as being "not available" in motion vector encoding, intra prediction, and entropy encoding (CAVLC/CABAC), with deblocking filter processing even pixel values belonging to different slices are processed as being "available" as long as they belong to the same picture.

Figure 5:
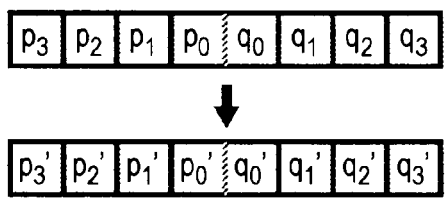
FIG. 5 is a diagram for describing an operating principle of a deblocking filter.

In the following we will say that the pixel values before deblocking filter processing are p0 through p3 and q0 through q3, and the pixel values after deblocking filter processing are p0' through p3' and q0' through q3', as shown in FIG. 5.

First, prior to the deblocking filter processing, Bs (Boundary Strength) is defined for p and q in FIG. 5, as with the table shown in FIG. 6.

The (p2, p1, p0, q0, q1, q2) in FIG. 5 is subjected to deblocking filter processing only in the event that the conditions shown in the following Expression (57) and Expression (58) hold.

$$Bs>0 \quad (57)$$

$$|p0-q0|\alpha; \; |p1-p0|<\beta; \; |q1-10|<\beta \quad (58)$$

In the default state, $\alpha$ and $\beta$ in Expression (58) have the values thereof determined in accordance with QP as shown below, but the user can adjust the intensities thereof as indicated by the arrows in the graph in FIG. 7, by the two parameters called slice_alpha_c0_offset_div 2 and slice_beta_offset_div 2 which are included in the slice header of the encoded data.

As shown in the table in FIG. 8, $\alpha$ is obtained from indexA. In the same way, $\beta$ is obtained from indexB. These indexA and indexB are defined as with the following Expression (59) through Expression (61).

$$qP_{av}=(qP_p+qP_q+1)>>1 \quad (59)$$

$$indexA=Clip3(0,51,qP_{av}+FilterOffsetA) \quad (60)$$

$$indexB=Clip3(0,51,qP_{av}+FilterOffsetB) \quad (61)$$

In Expression (60) and Expression (61), FilterOffsetA and FilterOffsetB correspond to the amount of adjustment by the user.

With deblocking filter processing, mutually different methods are defined for the case of Bs<4 and the case of Bs=4, as will be described below. In the case of Bs<4, the pixel values p'0 and q'0 after deblocking filter processing are obtained as with the following Expression (62) through Expression (64).

$$\Delta=Clip3(-t_c,t_c,((( q0-p0)<<2)+(p1-q1)+4)>>3)) \quad (62)$$

$$p'0=Clip1(p0+\Delta) \quad (63)$$

$$q'0=Clip1(q0+\Delta) \quad (64)$$

Now, $t_c$ is calculated as with Expression (65) or Expression (66) below. That is to say, in the event that the value of chromaEdgeFlag is "0", $t_c$ is calculated as with the following Expression (65).

$$t_c=t_{c0}+((a_p<\beta)?1:0)+((a_p<\beta)?1:0) \quad (65)$$

Also, in the event that the value of chromaEdgeFlag is other than "0", $t_c$ is calculated as with the following Expression (66).

$$t_c=t_{c0}+1 \quad (66)$$

The value of $t_{c0}$ is defined as shown in the table in A in FIG. 9 and B in FIG. 9, in accordance with Bs and the value of indexA.

Also, the values of $a_p$ and $a_q$ in Expression (65) are calculated as with the following Expressions (67) and (68).

$$a_p=|p2-p0| \quad (67)$$

$$a_q=|q2-q0| \quad (68)$$

The pixel value p'1 following deblocking filter processing is obtained as follows. That is to say, in the event that the value of chromaEdgeFlag is "0" and also the value of $a_p$ is other than $\beta$, p'1 is obtained as with the following Expression (69).

$$p'1=p1+Clip3(-t_{c0},t_{c0},(p2+((p0+q0+1)>>1)-(p1<<1))>>1) \quad (69)$$

Also, in the event that Expression (69) does not hold, p'1 is obtained as with the following Expression (70).

$$p'1=p1 \quad (70)$$

The pixel value q'1 following deblocking filter processing is obtained as follows. That is to say, in the event that the value of chromaEdgeFlag is "0" and also the value of $a_q$ is other than $\beta$, q'1 is obtained as with the following Expression (71).

$$q'1=q1+Clip3(-t_{c0},t_{c0},(q2+((p0+q0+1)>>1)-(q<<1))>>1) \quad (71)$$

Also, in the event that Expression (71) does not hold, q'1 is obtained as with the following Expression (72).

$$q'1=q1 \quad (72)$$

The values of p'2 and q'2 are unchanged from the values of p2 and q2 before Filtering. That is to say, p'2 is obtained as with the following Expression (73), and q'2 is obtained as with the following Expression (74).

$$p'2=p2 \quad (73)$$

$$q'2=q2 \quad (74)$$

In the case of Bs=4, the pixel values p'I (i=0 . . . 2) following deblocking filtering are obtained as follows. In the event that the value of chromaEdgeFlag is "0" and the conditions shown in the following Expression (75) hold, p'0, p'1, and p'2 are obtained as with the following Expression (76) through Expression (78).

$$a_p<\beta\&\&|p0-q0|<((\alpha>>2)+2) \quad (75)$$

$$p'0=(p2+2\times p1+2\times p0+2\times q0+q1+4)>>3 \quad (76)$$

$$p'1=(p2+p1+p0+q0+2)>>2 \quad (77)$$

$$p'2=(2\times p3+3\times p2+p1+p0+q0+4)>>3 \quad (78)$$

Also, in the event that the conditions shown in Expression (75) do not hold, p'0, p'1, and p'2 are obtained as with the following Expressions (79) through (81).

$$p'0=(2\times p1+p0+q1+2)>>2 \quad (79)$$

$$p'1=p1 \quad (80)$$

$$p'2=p2 \quad (81)$$

The pixel values q'i (I=0 . . . 2) following deblocking filter processing are obtained as follows. That is, in the event that the value of chromaEdgeFlag is "0" and the conditions shown in the following Expression (82) hold, q'0, q'1, and q'2 are obtained as with the following Expressions (83) through (85).

$$aq<\beta\&\&|p0-q0|<((\alpha>>2)+2) \quad (82)$$

$$q'0=(p1+2\times p0+2\times q0+2\times q1+q2+4)>>3 \quad (83)$$

$$q'1=(p0+q0+q1+q2+2)>>2 \tag{84}$$

$$q'2=(2\times q3+3\times q2+q1+q0+p4+4)>>3 \tag{85}$$

Also, in the event that the conditions shown in Expression (82) do not hold, q'0, q'1, and q'2 are obtained as with the following Expressions (86) through (88).

$$q'0=(2\times q1+q0+p1+2)>>2 \tag{86}$$

$$q'1=q1 \tag{87}$$

$$q'2=q2 \tag{88}$$

[Loop Filter]

Now, in the case of transmitting images with even higher resolution such as 4000×2000 pixels, or transmitting existing Hi-vision images over lines with limited bandwidth, as with the Internet, the compression rate realized by AVC is still insufficient.

Now, as one technique to improve encoding efficiency, a loop filter 113 is used with the image encoding device 100. A Wiener Filter, for example, is used for the loop filter 113. Of course, other than a Wiener Filter may be used for the loop filter 113. The loop filter 113 minimizes the residual as to the original image by performing filter processing as to the decoded image subjected to deblocking filter processing. The filter coefficient calculating unit 112 calculates loop filter coefficients such that the residual between the decoded image and original image is minimized by filter processing. The loop filter 113 uses this filter coefficient to perform filter processing. Note that this filter coefficient is transmitted to the image decoding device having been added to the encoded data, and is used for filter processing at the time of decoding as well.

By performing such filter processing, the image encoding device 100 can improve the image quality of the decoded image, and further can improve the image quality of the reference image.

[Selection of Prediction Mode]

Now, making the macroblock size to be 16 pixels×16 pixels is not optimal for large image frames such as UHD (Ultra High Definition; 4000 pixels×2000 pixels) which is the object of next-generation encoding formats. It has been proposed to make the macroblock size 32 pixels×32 pixels, 64 pixels×64 pixels, and so forth for example.

In order to achieve even higher encoding efficiency, selecting an appropriate prediction mode is important. For example, a method can be conceived wherein one technique of the two of a High Complexity Mode and a Low Complexity Mode is selected. In the case of this method, with either, cost function values relating to each prediction mode Mode are calculated, and the prediction mode which makes this the smallest is selected as the optional mode for the current block or macroblock.

The cost function with the High Complexity Mode can be obtained as with the following Expression (89).

$$\text{Cost}(\text{Mode}\in\Omega)=D+\lambda\times R \tag{89}$$

In the Expression (89), $\Omega$ is the whole set of candidate modes for encoding the current block or macroblock. Also, D is difference energy between the decoded image and input image in the case of encoding with the current prediction mode Mode. Further, $\lambda$ is a Lagrange multiplier given as a function of a quantization parameter. Also, R is the total code amount in the case of encoding with the current mode Mode, including orthogonal transform coefficients.

That is to say, in order to perform encoding with the High Complexity Mode, there is the need to perform tentative encoding processing once by all candidate modes Mode in order to calculate the above parameters D and R, requiring a greater amount of computations.

On the other hand, the cost function in the Low Complexity Mode can be obtained as shown in the following Expression (90).

$$\text{Cost}(\text{Mode}\in\Omega)=D+\text{QP2Quant}(\text{QP})\times\text{HeaderBit} \tag{90}$$

it is. In Expression (90), D is the difference energy between the prediction image and input image, unlike the case of the High Complexity Mode. Also, QP2Quant (QP) is given as a function of a quantization parameter QP. Further, HeaderBit is the code amount relating to information belonging to the Header not including orthogonal transform coefficients, such as motion vectors and mode.

That is to say, in the Low Complexity mode, prediction processing needs to be performed relating to each candidate mode Mode, but there is not need to perform all the way to a decoded image, so there is no need to perform all the way to decoding processing. Accordingly, realization with a smaller amount of computation as compared to the High Complexity Mode is enabled.

Figure 2:
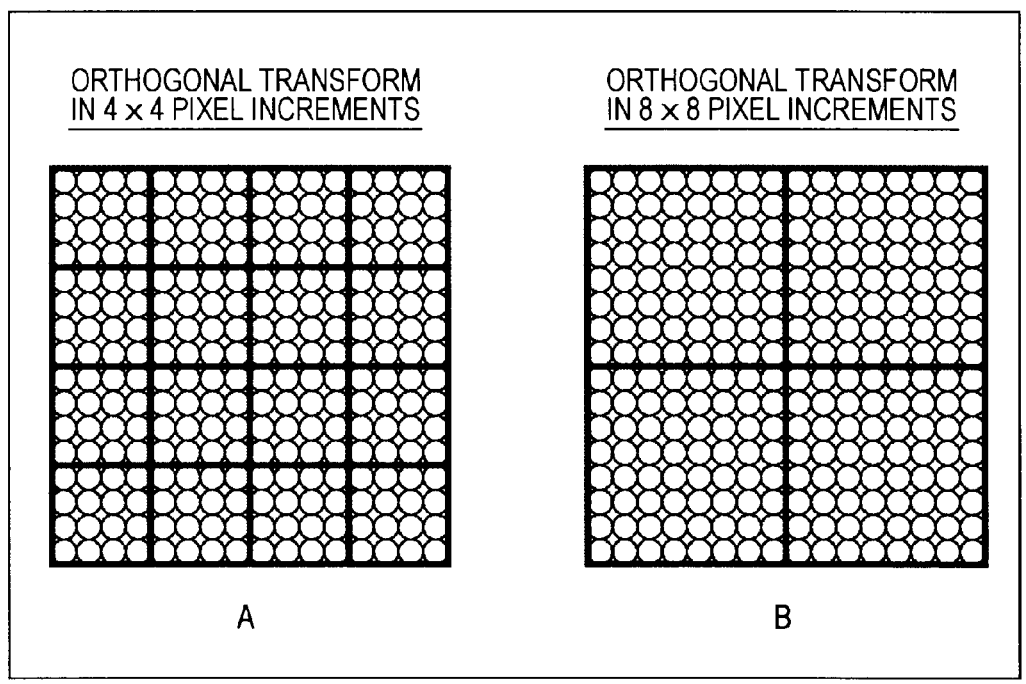
FIG. 2 is a diagram for describing an example of increments of orthogonal transform.

With High Profile, selection between 4×4 orthogonal transform and 8×8 orthogonal transform such as shown in FIG. 2 is performed based on one of the above-described High Complexity Mode and Low Complexity Mode.

Figure 10:
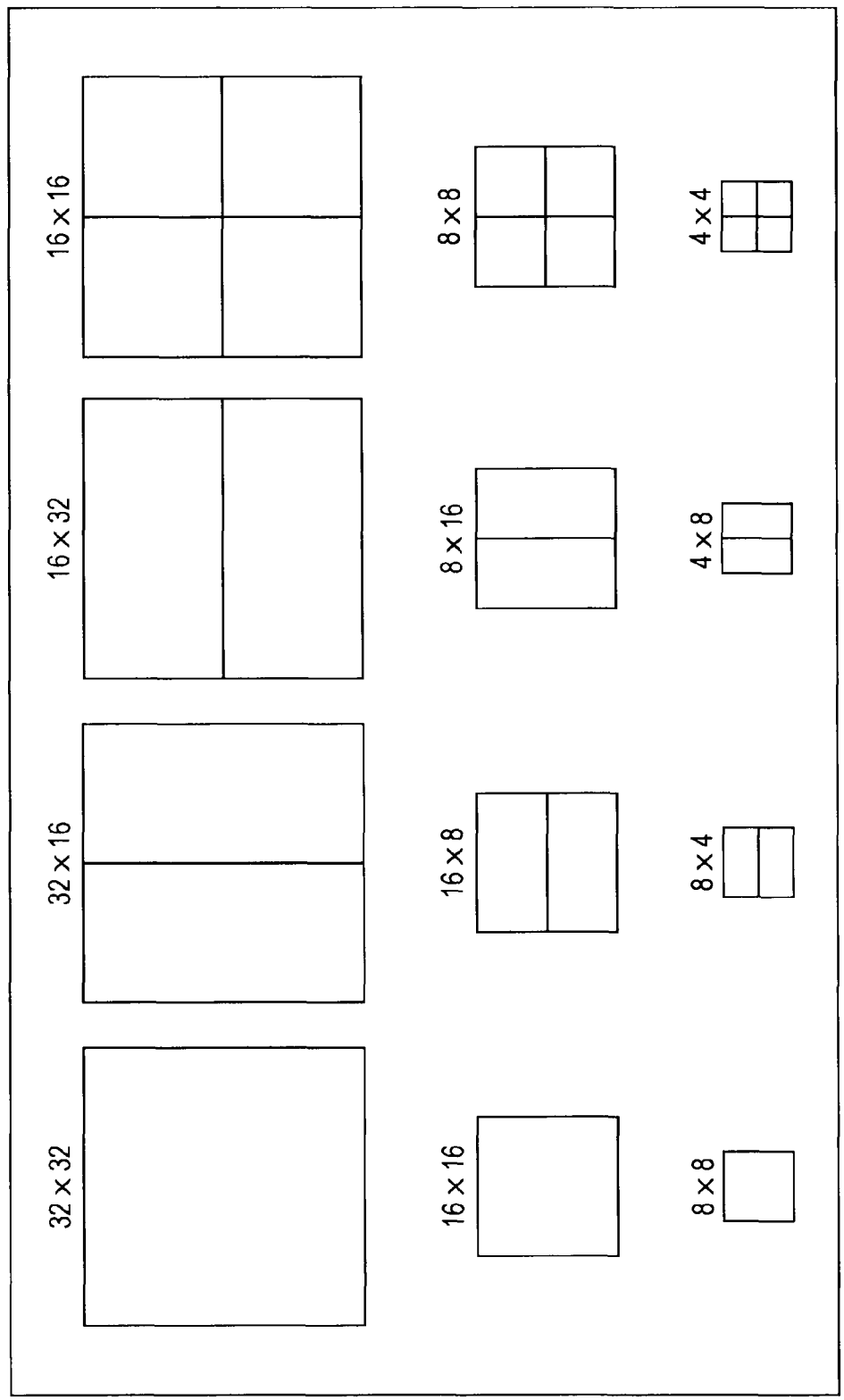
FIG. 10 is a diagram illustrating an example of macroblocks.

Now making the macroblock size to be 16 pixels×16 pixels is not optimal for large image frames such as UHD which is the object of next-generation encoding formats. It has been proposed to make the macroblock size 32 pixels× 32 pixels, for example, as shown in FIG. 10.

by employing a hierarchical structure such as shown in FIG. 10, a larger block is defined for 16×16 pixel blocks or smaller as a superset thereof, while maintaining compatibility with macroblocks in the current AVC.

Detailed Configuration Example

As described above, the image encoding device 100 applies loop filter processing to image encoding processing. The image encoding device 100 obtains an optimal filter coefficient for the loop filter processing for each orthogonal transform size, and performs filter processing of each macroblock with a filter coefficient appropriate for that orthogonal transform size.

The following is a detailed description of the configuration of the filter coefficient calculating unit 112 and loop filter 113 which are configurations relating to such a loop filter.

Figure 11:
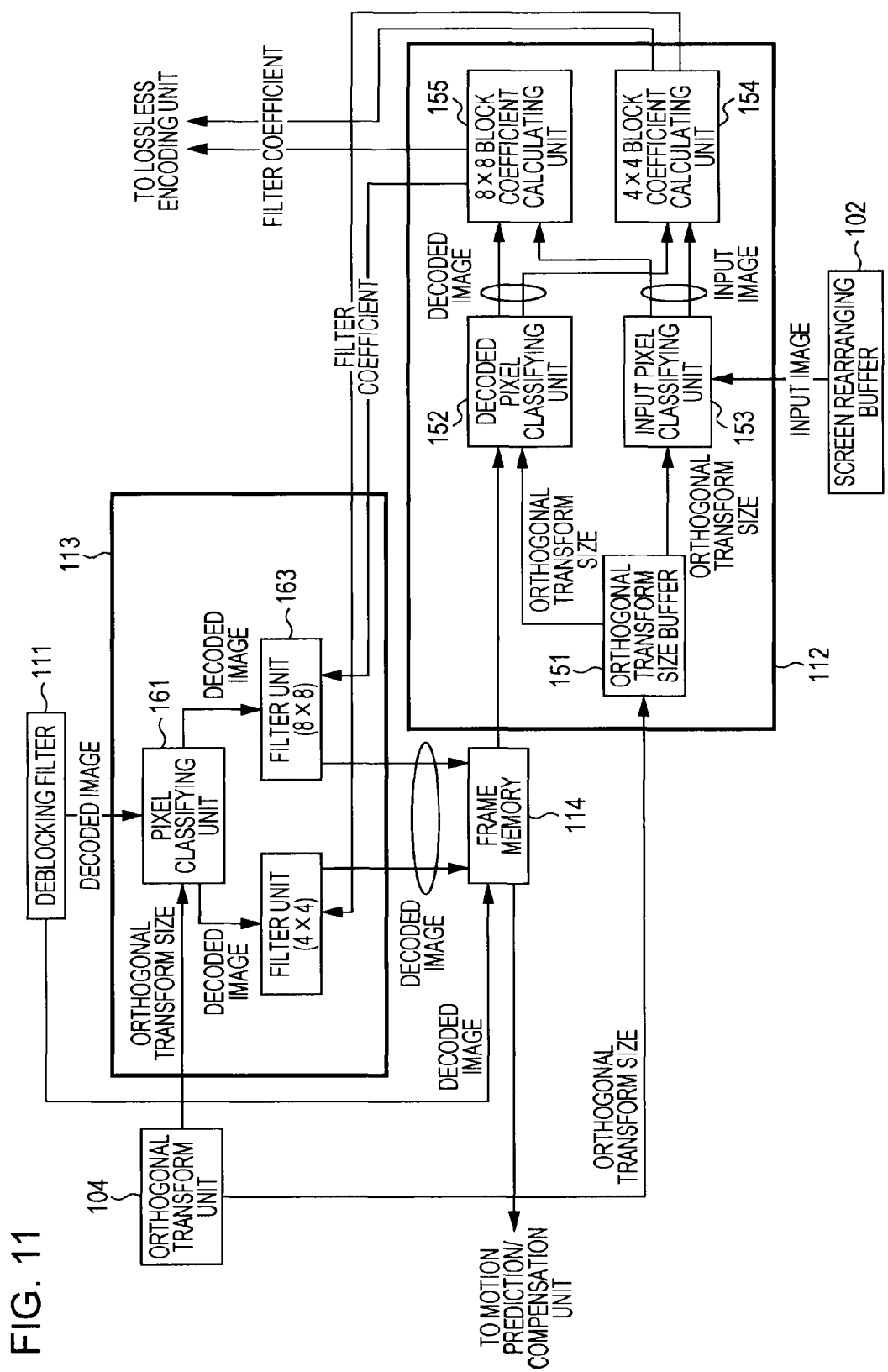
FIG. 11 is a block diagram illustrating a principal configuration example of a loop filer and filter coefficient calculating unit.

FIG. 11 is a block diagram illustrating a principal configuration example of the filter coefficient calculating unit 112 and loop filter 113.

As shown in FIG. 11, the filter coefficient calculating unit 112 has an orthogonal transform size buffer 151, a decoded pixel classifying unit 152, an input pixel classifying unit 153, a 4×4 block coefficient calculating unit 154, and an 8×8 block coefficient calculating unit 155.

Also, the loop filter 113 has a pixel classifying unit 161, a filter unit (4×4) 162, and a filter unit (8×8) 163.

First, the decoded image is supplied from the deblocking filter 111 to the frame memory 114. Also, information relating to the orthogonal transform size of each macroblock (whether 4×4 or whether 8×8) is supplied from the orthogonal transform unit 104 to the orthogonal transform size buffer 151 of the filter coefficient calculating unit 112.

The decoded image is further supplied from the frame memory 114 to the decoded pixel classifying unit 152 of the filter coefficient calculating unit 112. Also, the input image is supplied from the screen rearranging buffer 102 to the input pixel classifying unit 153.

The decoded pixel classifying unit 152 reads out the information relating to the orthogonal transform size from the orthogonal transform size buffer 151, and obtains this. The decoded pixel classifying unit 152 performs class classification (grouping) of the macroblocks of the decoded image into macroblocks regarding which 4×4 orthogonal transform has been applied (4×4 orthogonal transform blocks) and macroblocks regarding which 8×8 orthogonal transform has been applied (8×8 orthogonal transform blocks), based on the obtained orthogonal transform sizes. The decoded pixel classifying unit 152 then supplies, of the decoded image, the information relating to 4×4 orthogonal transform blocks to the 4×4 block coefficient calculating unit 154, and the information relating to 8×8 orthogonal transform blocks to the 8×8 block coefficient calculating unit 155.

In the same way, the input pixel classifying unit 153 reads out the information relating to the orthogonal transform size from the orthogonal transform size buffer 151, and obtains this. The input pixel classifying unit 153 performs class classification (grouping) of the macroblocks of the input image into macroblocks regarding which 4×4 orthogonal transform has been applied (4×4 orthogonal transform blocks) and macroblocks regarding which 8×8 orthogonal transform has been applied (8×8 orthogonal transform blocks), based on the obtained orthogonal transform sizes. The input pixel classifying unit 153 then supplies, of the input image, the information relating to 4×4 orthogonal transform blocks to the 4×4 block coefficient calculating unit 154, and the information relating to 8×8 orthogonal transform blocks to the 8×8 block coefficient calculating unit 155.

The 4×4 block coefficient calculating unit 154 calculates a filter coefficient (e.g., Weiner Filter coefficient) such that the residual is the smallest, using the decoded image and input image of a 4×4 orthogonal transform block supplied thereto. The 4×4 block coefficient calculating unit 154 supplies the calculated filter coefficient to the lossless encoding unit 106, and also supplies to the filter unit (4×4) 162 of the loop filter 113.

In the same way, the 8×8 block coefficient calculating unit 155 calculates a filter coefficient (e.g., Weiner Filter coefficient) such that the residual is the smallest, using the decoded image and input image of a 8×8 orthogonal transform block supplied thereto. The 8×8 block coefficient calculating unit 155 supplies the calculated filter coefficient to the lossless encoding unit 106, and also supplies to the filter unit (8×8) 163 of the loop filter 113.

The lossless encoding unit 106 adds the supplied filter coefficients to the encoded data.

Now, the pixel classifying unit 161 of the loop filter 113 is supplied with information relating to the orthogonal transform size (whether 4×4 or whether 8×8) regarding each macroblock form the orthogonal transform unit 104. The pixel classifying unit 161 thereof is supplied with the decoded image from the deblocking filter 111.

The pixel classifying unit 161 performs class classification (grouping) of the macroblocks of the decoded image into macroblocks regarding which 4×4 orthogonal transform has been applied (4×4 orthogonal transform blocks) and macroblocks regarding which 8×8 orthogonal transform has been applied (8×8 orthogonal transform blocks), based on the information relating to the orthogonal transform sizes supplied from the orthogonal transform unit 104. The pixel classifying unit 161 then supplies, of the decoded image, the information relating to 4×4 orthogonal transform blocks to the filter unit (4×4) 162, and the information relating to 8×8 orthogonal transform blocks to the filter unit (8×8) 163.

The filter unit (4×4) 162 applies an appropriate filter coefficient for the 4×4 orthogonal transform block supplied from the 4×4 block coefficient calculating unit 154, and performs filter processing on the 4×4 orthogonal transform blocks of the decoded image.

The filter unit (8×8) 163 applies an appropriate filter coefficient for the 8×8 orthogonal transform block supplied from the 8×8 block coefficient calculating unit 155, and performs filter processing on the 8×8 orthogonal transform blocks of the decoded image.

The filter unit (4×4) 162 and filter unit (8×8) 163 store the decoded image subjected to filter processing in the frame memory 114, so as to be output to the motion prediction/compensation unit 117 at a predetermined timing.

The filter coefficient calculating unit 112 and loop filter 113 perform processing such as above, to generate filter coefficients for each orthogonal transform size, and perform filter processing.

It can be said that local nature within an image is reflected in the orthogonal transform size. For example, 8×8 orthogonal transform is more likely selected for flat areas (portions where frequency is coarse), and 4×4 orthogonal transform is more likely selected for areas including fine texture (portions where frequency is dense).

Also, different image quality deterioration tendencies are observed between 8×8 orthogonal transform and 4×4 orthogonal transform. For example, mosquito noise is readily observed with 8×8 orthogonal transform, but mosquito noise is not readily observed with 4×4 orthogonal transform.

Accordingly, the filter coefficient calculating unit 112 reflects the local nature within the image in the filter coefficients by generating filter coefficients for each orthogonal transform size as described above. For example, the filter coefficient calculating unit 112 can effect control so as to adjust the values of the filter coefficients such that the loop filter 113 applies weaker filtering to portions where the frequency is coarse, and applies stronger filtering to portions where the frequency is dense.

Note that the filter coefficient calculating unit 112 can also increase/reduce the number of taps of the filter, besides simply changing the values of filter coefficients. For example, the filter coefficient calculating unit 112 may reduce the number of taps as to portions where the frequency is coarse, and increase the number of taps as to portions where the frequency is dense. Of course, the filter coefficient calculating unit 112 may perform both adjustment of values of filter coefficients and increase/reduction of the number of taps.

Filter processing is thus performed using filter coefficients in which local nature within the image has been reflected, so the loop filter 113 can perform noise removal appropriate for the local nature which the image has, and can further improve the image quality of the decoded image.

Note that the image encoding device 100 thus performs switching based on values already existing as syntax elements, called orthogonal transform size, so there is no need to newly add map information to the encoded data relating to which filter coefficient to send, and accordingly high image quality processing can be realized without increasing overhead in the encoded data (without reducing encoding efficiency).

[Flow of Processing]

Next, the flow of processing using the portions configured as described above will be described. First, an example of the flow of encoding processing performed by the image encoding device 100 will be described with reference to the flowchart in FIG. 12.

In step S101, the A/D conversion unit 101 converts an input image from analog to digital. In step S102, the screen rearranging buffer 102 stores the A/D converted image, and performs rearranging from the sequence for displaying the pictures to the sequence for encoding.

In step S103, the intra prediction unit 116 and motion prediction/compensation unit 117 and the like determine the prediction mode, and perform prediction processing to generate a prediction image. The details of this prediction processing will be described later.

In step S104, the computing unit 103 computes difference between an image rearranged by the processing in step S102 and the prediction image generated by the prediction processing in step S103. The prediction image is supplied to the computing unit 103 from the motion prediction/compensation unit 117 in the event of performing inter prediction, and from the intra prediction unit 116 in the event of performing intra prediction, via the selecting unit 118.

The difference data is smaller in the data amount as compared to the original image data. Accordingly, the data amount can be compressed as compared to the case of encoding the original image without change.

In step S105, the orthogonal transform unit 104 subjects the difference information generated by the processing in step S104 to orthogonal transform. Specifically, orthogonal transform, such as discrete cosine transform, Karhunen-Loéve transform, or the like, is performed, and a transform coefficient is output. In step S106, the quantization unit 105 quantizes the transform coefficient. At the time of this quantization, a rate is controlled such as later-described processing in step S115 will be described.

In step S107, the lossless encoding unit 106 encodes the quantized transform coefficient output from the quantization unit 105.

Also, the difference information thus quantized is locally decoded as follows. Specifically, in step S108, the inverse quantization unit 108 subjects the transform coefficient quantized by the quantization unit 105 to inverse quantization using a property corresponding to the property of the quantization unit 105. In step S109, the inverse orthogonal transform unit 109 subjects the transform coefficient subjected to inverse quantization by the inverse quantization unit 108 to inverse orthogonal transform using a property corresponding to the property of the orthogonal transform unit 104.

In step S110 the computing unit 110 adds the prediction image supplied via the selecting unit 118 to the locally decoded difference information, and generates a locally decoded image (the image corresponding to the input to the computing unit 103). In step S111, the deblocking filter 111 subjects the decoded image supplied from the computing unit 110 to deblocking filtering. Thus, block noise is removed.

Upon the above processing being performed for one picture, in step S112 the filter coefficient calculating unit 112 and loop filter 113 perform loop filter processing. The details of the loop filter processing will be described later.

In step S113, the lossless encoding unit 106 embeds (writes), in the slice header, metadata of the intra prediction mode information, the inter prediction mode information, filter coefficients for each orthogonal transform block, and so forth. This metadata is read out and used at the time of image decoding.

In step S114, the storing buffer 107 stores encoded data. The encoded data stored in the storing buffer 107 is read out as appropriate and transmitted to the decoding side via the transmission path.

In step S115, the rate control unit 119 controls the rate of the quantization operation of the quantization unit 105, so that overflow or underflow does not occur, based on the encoded data stored in the storing buffer 107.

Next, the example of the flow of prediction processing executed in step S103 in FIG. 12 will be described with reference to the flowchart in FIG. 13.

Upon prediction processing being started, in step S131, the intra prediction unit 116 uses the reference image obtained from the frame memory 114 via the selecting unit 115 and the input image supplied from the screen rearranging buffer 102 to calculate cost function values for each mode of intra 4×4, intra 8×8, and intra 16×16 (each intra mode prepared beforehand).

In step S132, the intra prediction unit 116 decides the best mode for each of the intra 4×4, intra 8×8, and intra 16×16, based on the cost function values of each mode calculated in step S131.

In step S133, the intra prediction unit 116 selects the best intra mode from the intra 4×4, intra 8×8, and intra 16×16.

In parallel with each processing of step S131 through step S133, the motion prediction/compensation unit 117 executes each processing of step S134 through step S137.

In step S134, the motion prediction/compensation unit 117 performs motion search. In step S135, the motion prediction/compensation unit 117 decides a motion vector/reference frame for each mode of inter 16×16 through 4×4.

In step S136, the motion prediction/compensation unit 117 calculates the cost function values for each of the modes of inter 16×16 through 4×4.

In step S137, the motion prediction/compensation unit 117 decides the best inter mode based on the cost function values.

In step S138, the selecting unit 118 decides one of the best intra mode selected in step S133 and the best inter mode decided in step S137 as the best mode.

In step S139, the intra prediction unit 116 or motion prediction/compensation unit 117 corresponding to the mode decided to be the best mode, generates a prediction image. This prediction image is supplied to the computing unit 103 and computing unit 110 via the selecting unit 118. Also, this prediction mode information of the best mode at this time (intra prediction mode information or inter prediction mode information) is supplied to the lossless encoding unit 106.

Figure 12:
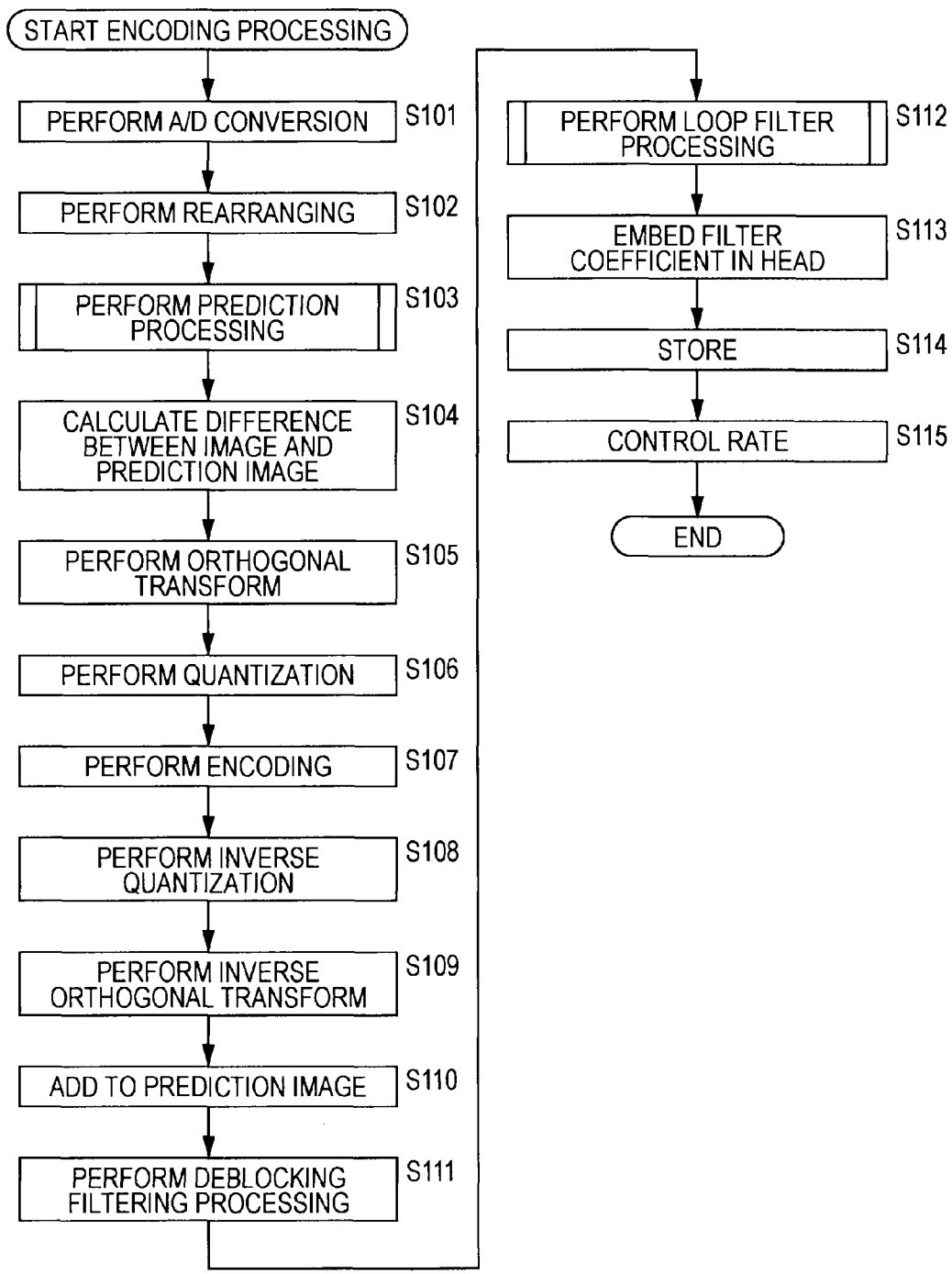
FIG. 12 is a flowchart describing an example of the flow of encoding processing.
Figure 13:
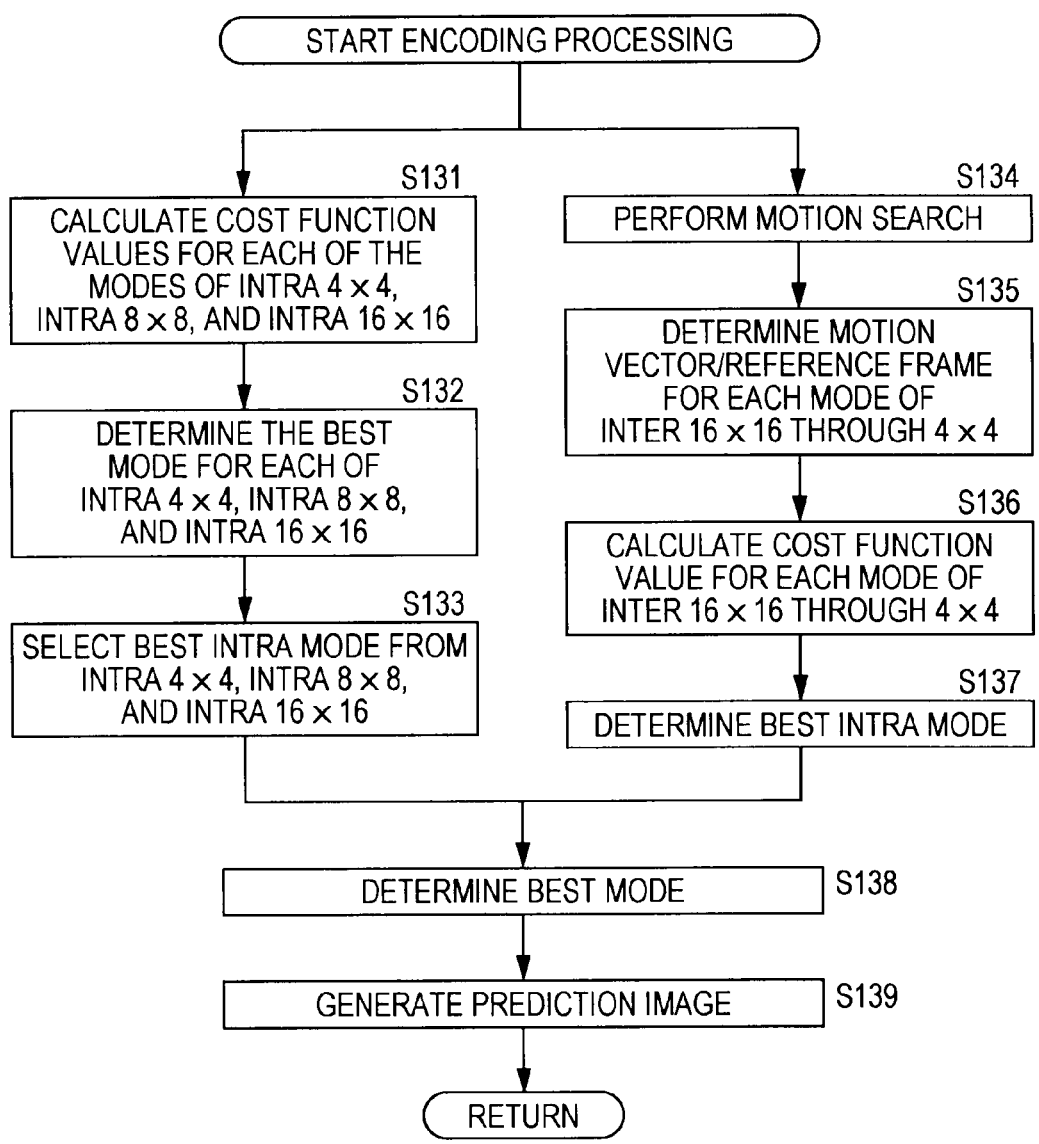
FIG. 13 is a flowchart describing an example of the flow of prediction processing.

Upon the prediction image being generated, prediction processing ends, the flow returns to step S103 in FIG. 12, and processing of step S104 and on is executed.

Figure 14:
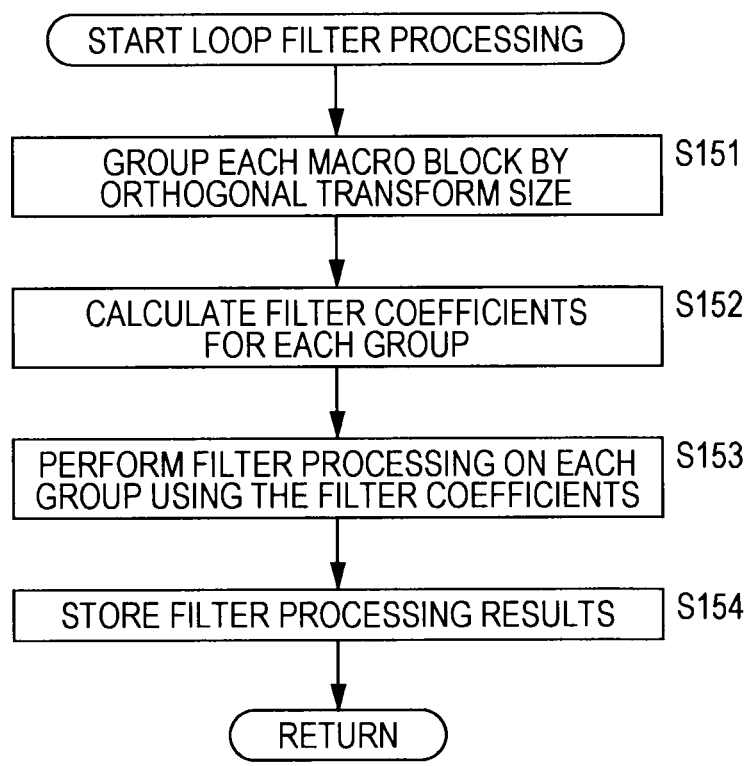
FIG. 14 is a flowchart describing an example of the flow of loop filter processing.

Next, an example of the flow of loop filter processing executed in step S112 of FIG. 12 will be described with reference to the flowchart in FIG. 14.

Upon loop filter processing being started, in step S151, the decoded pixel classifying unit 152, input pixel classifying unit 153, and pixel classifying unit 161 each group (perform class classification of) the macroblocks of the input image or decoded image supplied thereto, by each orthogonal transform size applied in the orthogonal transform processing executed in step S105 in FIG. 12.

In step S152, the 4×4 block coefficient calculating unit 154 and 8×8 block coefficient calculating unit 155 calculate filter coefficients for each of the groups.

In step S153, the filter unit (4×4) 162 and filter unit (8×8) 163 perform filter processing on each group using the filter coefficients calculated in step S152.

In step S154, the frame memory 114 stores the results of the filter processing performed in step S153 (the decoded image subjected to filter processing). This image is supplied to the motion prediction/compensation unit 117 as a reference image at a predetermined timing.

Upon the processing of step S154 ending, loop filter processing ends, the flow returns to step S112 in FIG. 12, and the processing of step S113 and on is executed.

By performing each processing such as above, the filter coefficient calculating unit 112 can generate appropriate filter coefficients for each orthogonal transform size. Also, the loop filter 113 can perform filter processing of each of the macroblocks, using filter coefficients according to the orthogonal transform sizes thereof.

As a result, the image encoding device 100 can perform noise removal appropriate for local nature within the image, and can obtain a reference image with higher image quality.

Further, the lossless encoding unit 106 adds these filter coefficients to the encoded data, so the filter coefficients can be used to perform appropriate filter processing on the decoded image obtained by an image decoding device decoding the encoded data. That is to say, the image encoding device 100 can increase the image quality of a decoded image obtained by decoding the encoded data which the image encoding device 100 has generated.

Note that in the above, "add" means to correlate control information with encoded data in an optional form. For example, this may be described as a syntax of encoded data, or may be described as user data. Also, the information of filter coefficients and the like may be placed in a state of being linked with the encoded data as metadata. That is to say, "add" includes "embed", "describe", "multiplex", "link", and so forth. This holds true hereinafter as well.

Also, while description has been made above with the orthogonal transform sizes being 4×4 and 8×8, the orthogonal transform sizes are optional. Also, the number of orthogonal transform sizes applied is also optional.

Grouping (class classification) in the case of the orthogonal transform sizes applied being three or more may be performed such that classification is performed as to two of all orthogonal transform sizes, and the other orthogonal transform sizes being ignored (not selected). In this case, the ignored group is not subjected to filter processing. In this case, whether or not to perform filter processing may be controlled by flag information or the like, for example.

Also, for example, the orthogonal transform sizes may be arranged so as to be dividable into two groups. That is to say, in this case, there may coexist multiple orthogonal transform sizes in one group. Further, for example, the orthogonal transform sizes may be dividable into mutually different groups. In this case, the number of groups is three or more. In this case, the number of coefficient calculating units and filter units (FIG. 11) prepared is the same as the number of groups.

Also, the increments of processing with filters may be in frames, or may be in slices, or may be otherwise. Also, increments for performing class classification (image size of partial images which are the increments of processing) may be other than macroblocks.

Second Embodiment

[Configuration of Device]

Figure 15:
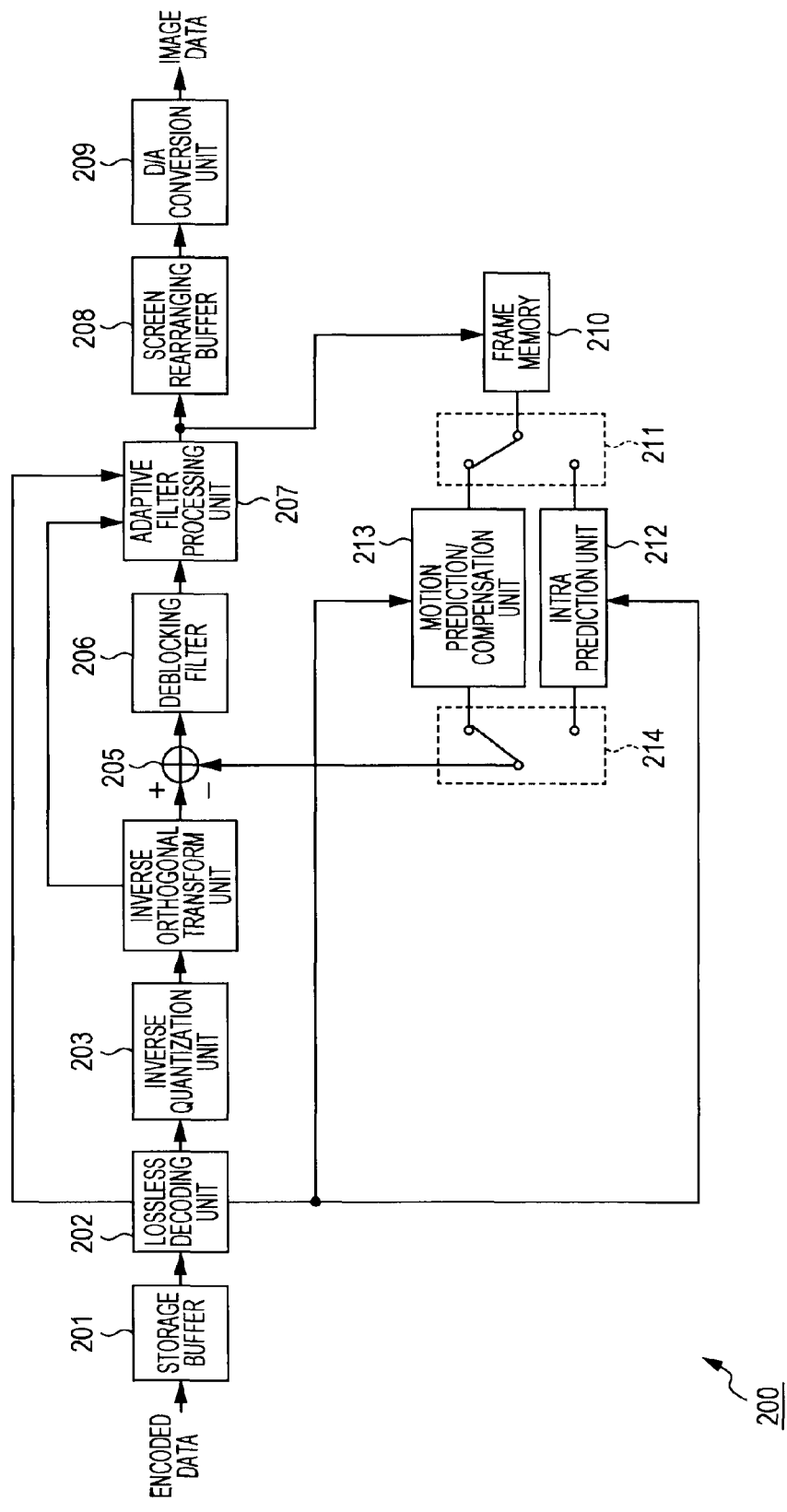
FIG. 15 is a block diagram illustrating a primary configuration example of an image decoding device to which the present invention has been applied.

Next, an image decoding device corresponding to the image encoding device 100 described with the first embodiment will be described. FIG. 15 is a block diagram illustrating the configuration example of an embodiment of an image decoding device serving as an image processing device to which the present invention has been applied.

An image decoding device 200 decodes encoded data output from the image encoding device 100, and generates a decoded image.

An image decoding device 200 is configured of a storing buffer 201, a lossless decoding unit 202, an inverse quantization unit 203, an inverse orthogonal transform unit 204, a computing unit 205, and a deblocking filter 206. The image decoding device 200 also has a loop filter 207. The image decoding device 200 further has a screen rearranging buffer 208 and a D/A (Digital/Analog I) conversion unit 209. The image decoding device 200 also has frame memory 210, a selecting unit 211, an intra prediction unit 212, a motion prediction/compensation unit 213, and a selecting unit 214.

The storing buffer 201 stores encoded data transmitted thereto. The lossless decoding unit 202 decodes information supplied from the storing buffer 201 and encoded by the lossless encoding unit 106 in FIG. 1 using a format corresponding to the encoding format of the lossless encoding unit 106.

In the event that the current macroblock has been intra encoded, the lossless decoding unit 202 extracts the intra prediction mode information stored in the header portion of the encoded data, and transmits this to the intra prediction unit 212. Also, in the event that the current macroblock has been inter encoded, the lossless decoding unit 202 extracts the motion vector information, inter prediction mode information, and so forth, stored in the header portion of the encoded data, and transfers this to the motion prediction/compensation unit 213.

Also, the lossless decoding unit 202 extracts filter coefficients for each of the orthogonal transform sizes from the encoded data, and supplies these to the loop filter 207.

The inverse quantization unit 203 subjects the image decoded by the lossless decoding unit 202 to inverse quantization using a format corresponding to the quantization format of the quantization unit 105 in FIG. 1.

The inverse orthogonal transform unit 204 subjects the output of the inverse quantization unit 203 to inverse orthogonal transform using a format corresponding to the orthogonal transform format of the orthogonal transform unit 104 in FIG. 1. The inverse orthogonal transform unit 204 supplies the difference information subjected to inverse orthogonal transform to the computing unit 205. Also, the inverse orthogonal transform unit 204 supplies the orthogonal transform sizes applied to each macroblock in the inverse orthogonal transform processing thereof, to the loop filter 207.

The computing unit 205 adds the prediction image supplied from the selecting unit 214 to the difference information subjected to inverse orthogonal transform, and generates a decoded image. The deblocking filter 206 removes the block noise of the decoded image which has been generated by the adding processing.

The loop filter 207 groups (class classification) of each of the macroblocks supplied from the deblocking filter 206 based on information supplied from the inverse orthogonal transform unit 204, for each of the inverse orthogonal transform sizes applied in the inverse orthogonal transform processing by the inverse orthogonal transform unit 204, and performs filter processing on each group (class) using the filter coefficients supplied from the lossless decoding unit 202.

These filter coefficients are coefficients which have been generated at the filter coefficient calculating unit 112 of the image encoding device 100, and have been calculated such that the residual is smallest for each orthogonal transform size, as described in the first embodiment. That is to say, the filter coefficients for each orthogonal transform size are each set to an appropriate value to their corresponding orthogonal transform sizes.

Accordingly, the loop filter 207 can reduce block noise and noise due to quantization which could not be completely removed with the deblocking filter 206. At this time, the loop filter 207 performs noise removal appropriate for local nature within the image, and accordingly can output a decoded image of higher image quality.

The loop filter 207 supplies the image following filter processing to the frame memory 210 so as to be stored as a reference image, and also outputs to the screen rearranging buffer 208.

The screen rearranging buffer 208 performs rearranging of images. That is to say, the order of frames rearranged for encoding by the screen rearranging buffer 102 in FIG. 1 is rearranged to the original display order. The D/A conversion unit 209 performs D/A conversion of the image supplied from the screen rearranging buffer 208, and outputs. For example, the D/A conversion unit 209 outputs the output signals obtained by performing D/A conversion to an unshown display, and displays an image.

The intra prediction unit 212 obtains a reference image from the frame memory 210 via the selecting unit 211 and generates a prediction image based on the information supplied from the lossless decoding unit 202 in the event that the current frame has been intra encoded, and supplies the generated prediction image to the computing unit 205 via the selecting unit 214.

In the event that the current frame has been inter encoded, the motion prediction/compensation unit 213 obtains a reference image from the frame memory 210 via the selecting unit 211 and performs motion compensation processing as to the reference image, based on the motion vector information supplied from the lossless decoding unit 202, and generates a prediction image. The motion prediction/compensation unit 213 supplies the generated prediction image to the computing unit 205 via the selecting unit 214.

In the event that the current macroblock has been intra encoded, the selecting unit 214 connects to the intra prediction unit 212, and supplies the image supplied from the intra prediction unit 212 to the computing unit 205 as a prediction image. Also, in the event that the current macroblock has been inter encoded, the selecting unit 214 connects to the motion prediction/compensation unit 213 and supplies the image supplied from the motion prediction/compensation unit 213 to the computing unit 205 as a prediction image.

Figure 16:
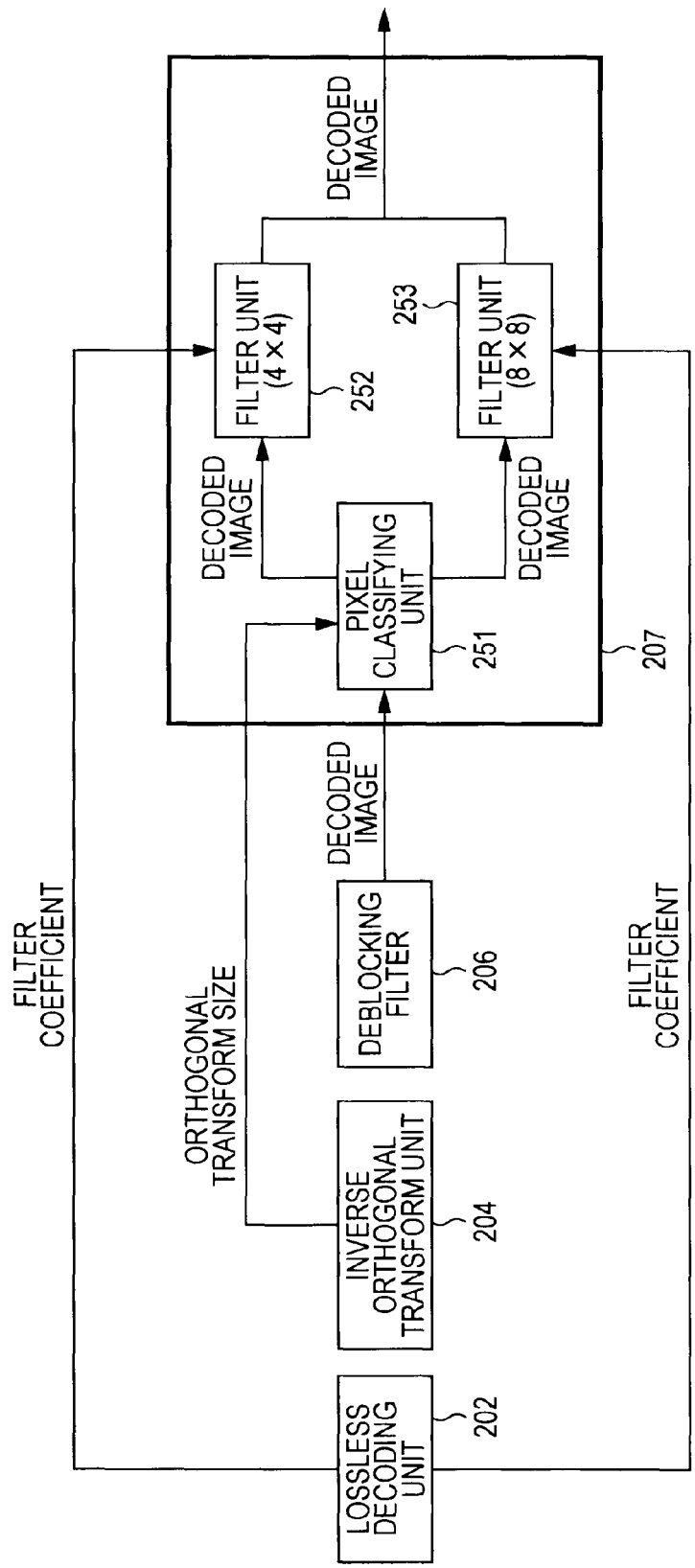
FIG. 16 is a diagram illustrating a principal configuration example of a loop filter.

FIG. 16 is a block diagram illustrating a detailed configuration example of the loop filter 207 in FIG. 15.

The loop filter 207 is configured basically with the same configuration as the image encoding device 100, and executes the same processing. As shown in FIG. 16, the loop filter 207 has a pixel classifying unit 251, a filter unit (4×4) 252, and a filter unit (8×8) 253.

The pixel classifying unit 251 performs class classification (grouping) of the macroblocks of the decoded image supplied from the deblocking filter 206 into macroblocks regarding which 4×4 orthogonal transform has been applied (4×4 orthogonal transform blocks) and macroblocks regarding which 8×8 orthogonal transform has been applied (8×8 orthogonal transform blocks), based on the orthogonal transform sizes supplied from the inverse orthogonal transform unit 204. The pixel classifying unit 251 then supplies, of the decoded image, the information relating to 4×4 orthogonal transform blocks to the filter unit (4×4) 252, and the information relating to 8×8 orthogonal transform blocks to the filter unit (8×8) 253.

The filter unit (4×4) 252 applies an appropriate filter coefficient for the 4×4 orthogonal transform block supplied from the lossless decoding unit 202, and performs filter processing on the 4×4 orthogonal transform blocks of the decoded image.

The filter unit (8×8) 253 applies an appropriate filter coefficient for the 8×8 orthogonal transform block supplied from the lossless decoding unit 202, and performs filter processing on the 8×8 orthogonal transform blocks of the decoded image.

The filter unit (4×4) 252 and filter unit (8×8) 253 supply the decoded image that has been subjected to filter processing to the screen rearranging buffer 208 and frame memory 210.

The loop filter 207 thus classifies each macroblock in the decoded image by the orthogonal transform size thereof, and performs filter processing using the filter coefficient for the orthogonal transform size thereof. These filter coefficients have been extracted from the encoded data by the lossless decoding unit 202, and as described with the first embodiment, have been generated so as to be appropriate for the image of each of the orthogonal transform size blocks. Accordingly, in the same way as with the case of the loop filter 113 described with the first embodiment, the loop filter 207 can perform noise removal appropriate for the local nature which the image has, and consequently obtain decoded images with higher image quality.

[Flow of Processing]

An example of the flow of decoding processing which this image decoding device 200 executes will be described with reference to the flowchart in FIG. 17.

In step S201, the storing buffer 201 stores the transmitted image (encoded data). In step S202, the lossless decoding unit 202 extracts filter coefficients from the encoded data. The lossless decoding unit 202 also extracts motion vector information, reference frame information, prediction mode information (intra prediction mode information and inter prediction mode information), and so forth.

In step S203, the lossless decoding unit 202 performs lossless decoding processing of the encoded data. In step S204, the inverse quantization unit 203 inversely quantizes the transform coefficients decoded in step S203, using a property corresponding to the property of the quantization unit 105 in FIG. 1. In step S205, the inverse orthogonal transform unit 204 subjects the transform coefficient inversely quantized in step S204 to inverse orthogonal transform using a property corresponding to the property of the orthogonal transform unit 104 in FIG. 1. This means that difference information corresponding to the input of the orthogonal transform unit 104 in FIG. 1 (the output of the computing unit 103) has been decoded.

In step S206, the intra prediction unit 212 and motion prediction/compensation unit 213 and the like perform prediction image generating processing to generate a prediction image in accordance with the prediction mode. Details of this prediction image generating processing will be described later. In step S207, the computing unit 205 adds the prediction image generated in step S206 to the difference information decoded by the processing up through step S205. Thus, the original image is decoded.

In step S208, the deblocking filter 206 subjects the image output from the computing unit 205 to filtering. Thus, block noise is removed.

In step S209, the loop filter 207 and the like perform loop filer processing, and further perform adaptive filter processing on the image which has been subjected to deblocking filter processing. While details will be described later, this loop filter processing is basically the same as the processing which the loop filter 113 in FIG. 1 performs.

Due to this adaptive filter processing, block noise and noise due to quantization which could not be completely removed with the deblocking filter processing can be reduced.

In step S210, the screen rearranging buffer 208 performs rearranging. Specifically, the sequence of frames rearranged for encoding by the screen rearranging buffer 102 of the image encoding device 100 in FIG. 1 is rearranged to the original display sequence.

In step S211, the D/A conversion unit 209 performs D/A conversion of the images rearranged in step S210. This image is output to an unshown display, and the image is displayed. Upon the processing of step S211 ending, the decoding processing ends.

Next, an example of the flow of prediction image generating processing executed in step S206 in FIG. 17 will be described with reference to the flowchart in FIG. 18.

Upon the prediction image generating processing being started, in step 231 the lossless decoding unit 202 determines whether or not the current block has been intra encoded, based on the information such as prediction mode and the like extracted in step S202. In the event that this is a block which has been intra encoded, the lossless decoding unit 202 supplies the intra prediction mode information extracted from the encoded data to the intra prediction unit 212, and the flow advances to step S232.

In step S232, the intra prediction unit 212 obtains the intra prediction mode information supplied from the lossless decoding unit 202. Upon obtaining the intra prediction mode information, in step S233 the intra prediction unit 212 obtains a reference image from the frame memory 210 via the selecting unit 211, based on the intra prediction mode information, and generates an intra prediction image. Upon generating the intra prediction image, the intra prediction unit 212 supplies this intra prediction image to the computing unit 205 via the selecting unit 214 as a prediction image.

Also, in the event that determination is made in step S231 that the current block has been inter encoded, the lossless decoding unit 202 supplies the motion prediction mode, reference frame, and motion vector information, and the like extracted from the encoded data, to the motion prediction/compensation unit 213, and the flow advances to step S234.

In step S234, the motion prediction/compensation unit 213 obtains the motion prediction mode, reference frame, and motion vector information, and the like supplied from the lossless decoding unit 202. Upon obtaining this information, in step S235 the motion prediction/compensation unit 213 selects an interpolation filter in accordance with the motion vector information, and in step S236 obtains a reference image from the frame memory 210 via the selecting unit 211, and generates an inter prediction image. Upon generating the inter prediction image, the motion prediction/compensation unit 213 supplies the inter prediction image to the computing unit 205 via the selecting unit 214, as a prediction image.

Figure 17:
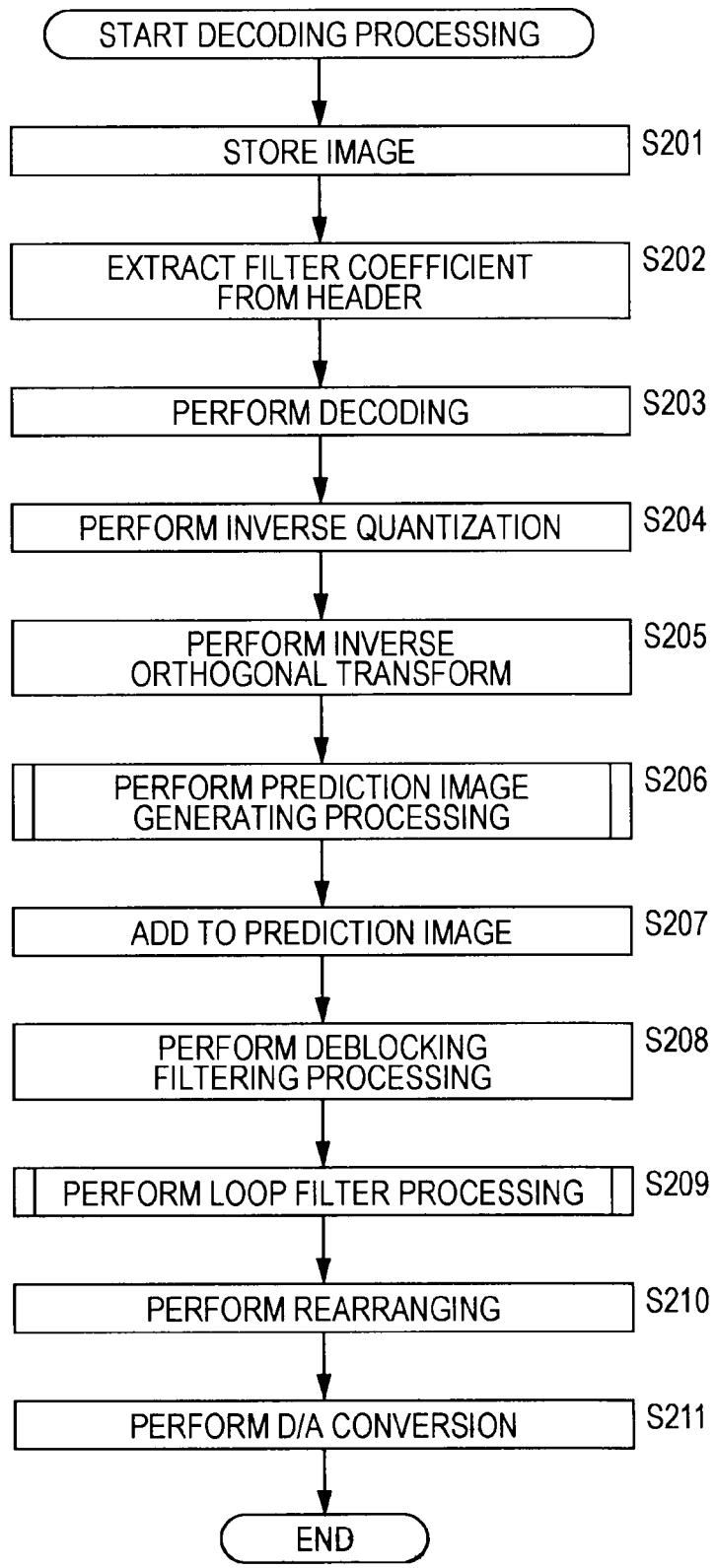
FIG. 17 is a flowchart describing an example of the flow of decoding processing.
Figure 18:
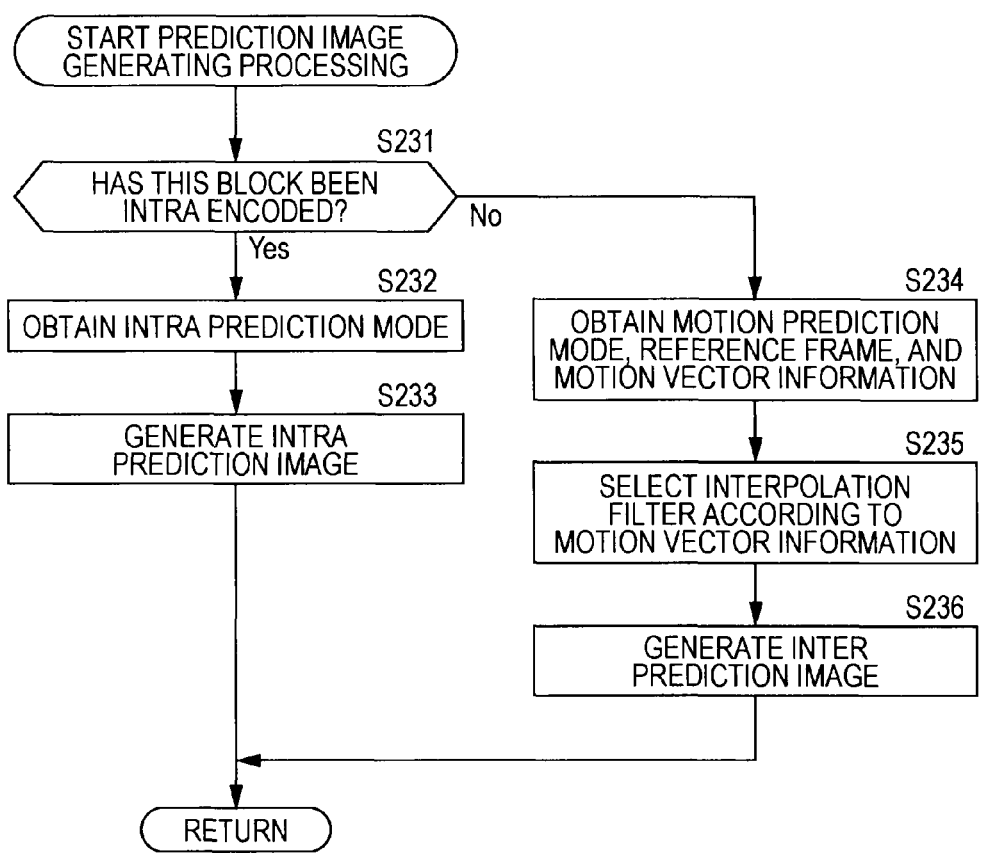
FIG. 18 is a flowchart describing an example of the flow of prediction image generating processing.

Upon the processing of step S233 or step S236 ending, the prediction image generating processing is ended, the flow returns to step S206 in FIG. 17, and the processing of step S207 and on is executed.

Figure 19:
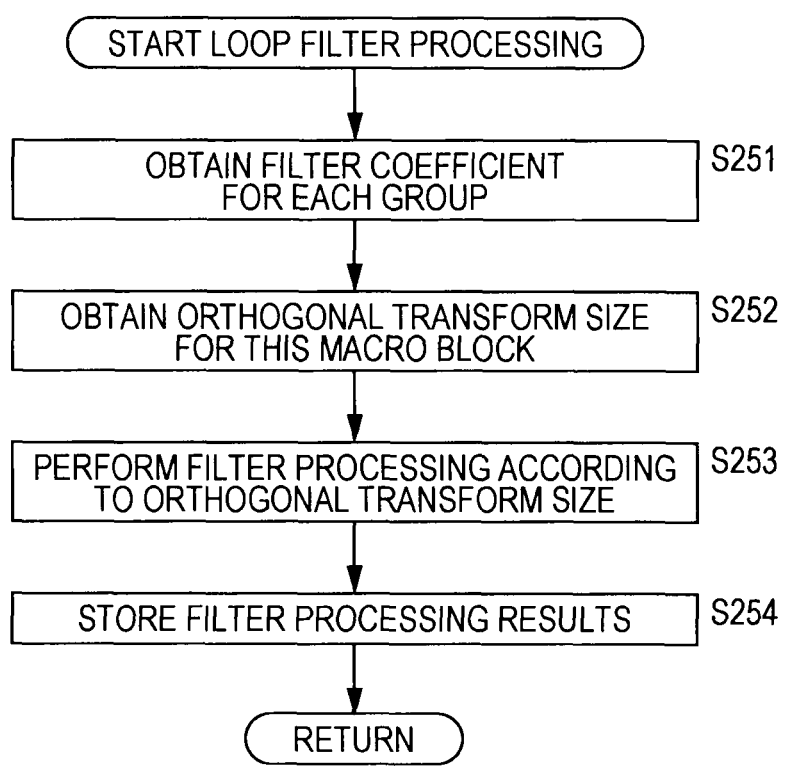
FIG. 19 is a flowchart describing an example of the flow of loop filter processing.

Next, an example of the flow of loop filter processing executed in step S209 of FIG. 17 will be described with reference to the flowchart in FIG. 19.

Upon loop filer processing being started, in step S251, the filter unit (4×4) 252 and filter unit (8×8) 253 of the loop filter 207 obtain filter coefficients of each group from the lossless decoding unit 202.

In step S252, the pixel classifying unit 251 obtains the orthogonal transform size of the current macroblock from the inverse orthogonal transform unit 204. Based on the obtained orthogonal transform size, the pixel classifying unit 251 performs class classification of the current macroblock.

In step S253, the filter unit corresponding to the orthogonal transform size of the current macroblock (either the filter unit (4×4) 252 or filter unit (8×8) 253) uses the filter coefficient obtained in step S251 to perform filter processing on the current macroblock corresponding to the orthogonal transform size.

In step S254, the frame memory 210 stores the filter processing results of step S253.

Upon the processing of step S254 ending, the loop filter processing ends, the flow returns to step S209 in FIG. 17, and processing of step S210 and on is performed.

By performing each of the processing in this way, the loop filter 207 performs filter processing, and block noise and noise due to quantization which could not be completely removed with the deblocking filter processing can be reduced.

Also, at this time, the loop filter 207 performs filer processing using filter coefficients extracted from the encoded data. These filter coefficients are coefficients which have been generated such that the residual is smallest for each orthogonal transform size of macroblocks. The loop filter 207 performs filter processing of the current macroblock which is the object of processing, using a filter coefficient for that orthogonal transform size. Thus, the loop filter 207 can perform noise removal appropriate for local nature within the image. As a result, the image decoding device 200 can obtain decoded images with even higher image quality.

Also, in the same way as with the case of the first embodiment, the orthogonal transform sizes are optional. Also, the number of orthogonal transform sizes applied is optional.

The method for grouping (class classification of) macroblocks may be any method as long as corresponding to the method of the image encoding device 100 which has generated the encoded data. Also, the increments of processing with filters may be in frames, or may be in slices, or may be otherwise.

Third Embodiment

[Description of ALF Block Control]

Note that in addition to control of filter coefficients such as described above, BALF (Block based Adaptive Loop Filter) in which loop filter processing is not performed at regions where image quality will locally deteriorate due to loop filtering may be applied. BALF will be described below.

Figure 20:
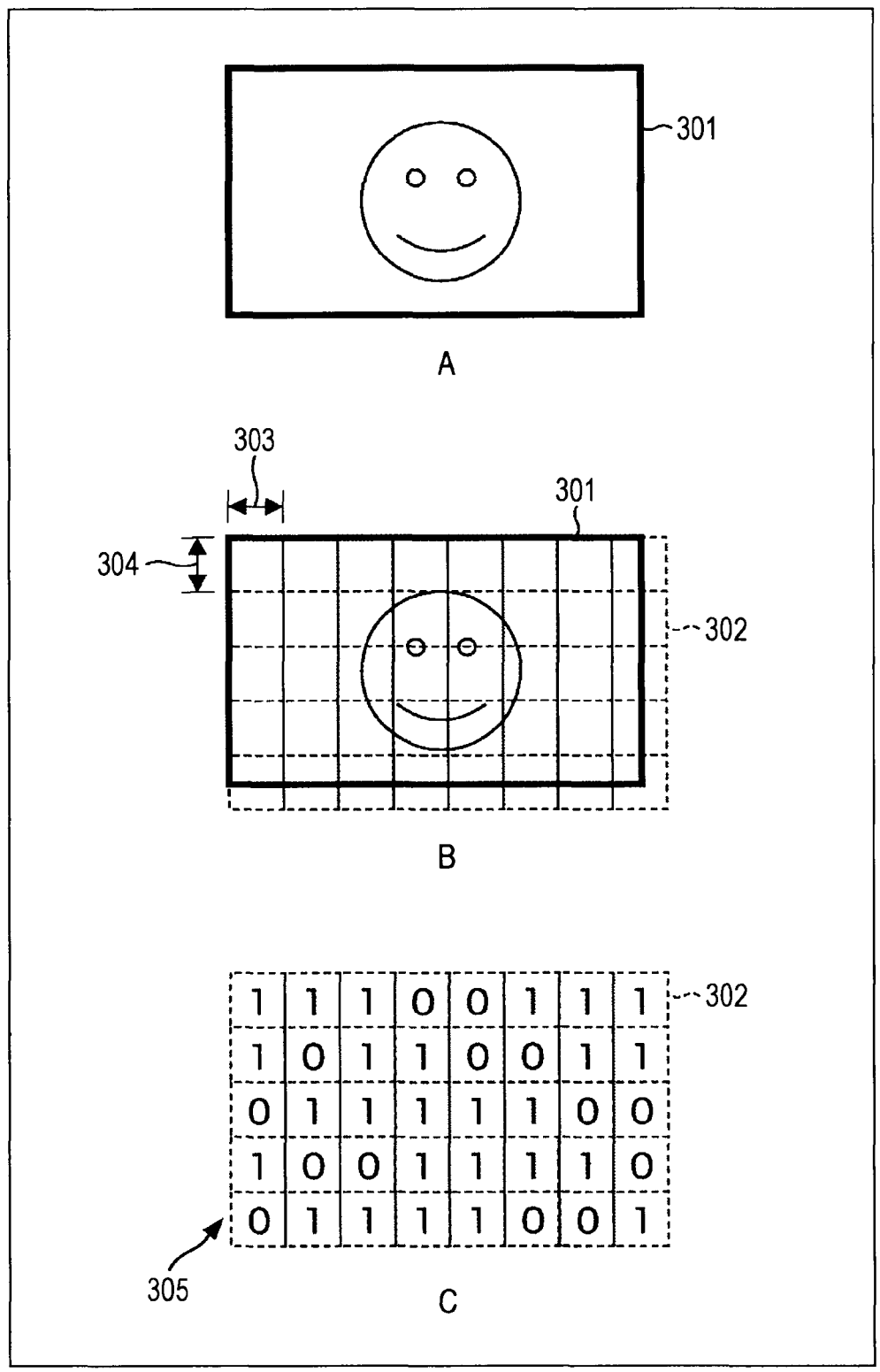
FIG. 20 is a diagram describing ALF blocks and filter block flags.

A decoded image following deblocking filter processing is shown in frame 301 in A in FIG. 20. As shown in B in FIG. 20, multiple ALF (Adaptive Loop Filter) blocks 302, which are control blocks serving as the increment of control for adaptive filter processing locally performed, are laid out without gaps as if they were being used for paving the entire region of the frame 301. The region where the ALF blocks 302 are placed does not have to be the same as the region of the frame 301, but includes at least the entire region of the frame 301. The region of the frame 301 is resultantly divided by the regions of the ALF blocks 302 (multiple control regions).

The horizontal direction size (both-sided arrow 303) and vertical direction size (both-sided arrow 304) of the ALF blocks 302 may be one of 8×8, 16×16, 24×24, 32×32, 48×48, 64×64, 96×96, or 128×128, for example. Note that the information specifying the size of the ALF block will be called block size index.

Once the block size is decided, the number of ALF blocks per frame has also been decided, since the frame size is fixed.

As shown in C in FIG. 20, a filter block flag 305 which controls whether or not to perform filter processing is set in each ALF block 302. For example, a filter block flag 305 with a value of "1" is generated for a region where the image quality is improved by the adaptive filter, and a filter block flag 305 with a value of "0" is set for a region where the image quality is deteriorated by the adaptive filter. With the filter block flag 305, the value of "1" is a value indicating that filter processing is to be performed, and the value of "0" is a value indicating that filter processing is not to be performed.

Whether or not to perform loop filter processing is controlled based on the value of the filter block flag 305, for each ALF block 302. For example, the loop filter 113 performs filter processing only at the regions where the ALF blocks 302 have a value of "1" for the filter block flag 305, and does not perform filter processing at the regions where the ALF blocks 302 have a value of "0" for the filter block flag 305.

For example, such ALF blocks 302 and filter block flags 305 are set at the filter coefficient calculating unit 112, and the loop filter 113 performs filter processing as described above based on that information.

Thus, the loop filter 113 can keep filter processing from being performed at regions where filter processing would locally deteriorate the image quality, thereby further improving the image quality of the reference image.

Note that information relating to the ALF blocks 302 and filter block flags 305 is added to the encoded data and supplied to the image decoding device 200. Thus, the loop filter 207 of the image decoding device 200 can also perform filter processing in the same way as with the loop filter 113, and can keep filter processing from being performed at regions where filter processing would locally deteriorate the image quality. As a result, the image quality of the decoded image can be further improved.

Fourth Embodiment

[Description of QALF]

ALF blocks described with the third embodiment may have a quad tree structure. This technique is called QALF (Quad tree-based Adaptive Loop Filter). A quad tree structure is a hierarchical structure where, at a lower hierarchical level, the region of one ALF block one hierarchical level above is divided into four.

Figure 21:
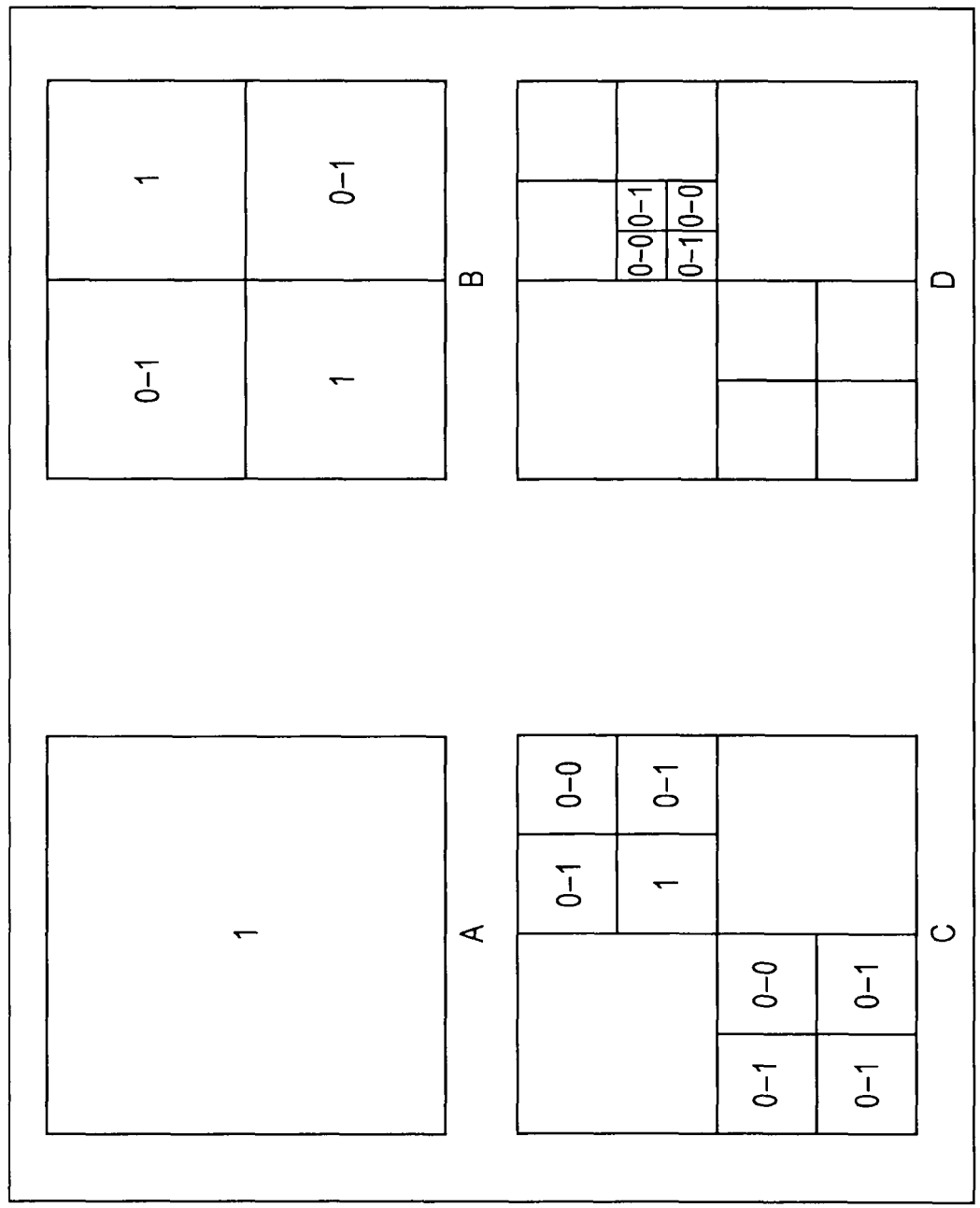
FIG. 21 is a diagram describing another example of ALF blocks and filter block flags.

FIG. 21 illustrates an example where ALF block division is expressed by a quad tree structure where the maximum number of layers is three, with a filter block flag being specified for each ALF block.

A in FIG. 21 indicates a layer 0 which is an ALF block serving as the root of the quad tree structure. In the quad tree structure, each ALF block has a block partitioning flag indicating whether or not it is divided into four at the lower hierarchical level. The value of the block partitioning flag of the ALF block shown in A in FIG. 21 is "1". That is to say, this ALF block is divided into four in the lower hierarchical level (layer 1). B in FIG. 21 shows the layer 1. That is to say, four ALF blocks are formed in the layer 1.

In the event that the block partitioning flag is "0", a further lower hierarchical level is not divided into four. That is to say, there is no further division, and a filter block flag is generated as to that ALF block. That is to say, an ALF block of which the block partitioning flag is "0" also has a filter block flag. The "0" to the left of the "0-1" shown in B in FIG. 21 indicates the block partitioning flag of that ALF block, and the "1" to the right shows the filter block flag of that ALF block.

The two ALF blocks of which the block partitioning flag in layer 1 is "1" are divided into four in the lower hierarchical level (layer 2). C in FIG. 21 illustrates the layer 2. That is to say, ten ALF blocks are formed in layer 2.

In the same way, ALF blocks with the block partitioning flag of "0" in layer 2 are also assigned a filter block flag. In C in FIG. 21, the block partitioning flag of one ALF block is "1". That is to say, that ALF block is divided into four in the further lower hierarchical level (layer 3). D in FIG. 21 shows the layer 3. That is to say, 13 ALF blocks are formed in the layer 3.

Thus, with a quad tree structure, the size of ALF blocks differs with each hierarchical level. That is to say, by using a quad tree structure, the sizes of the ALF blocks can be made to be different one from another within the frame.

Control of the filter block flag in each ALF block is the same as with the third embodiment. That is to say, filter processing is not performed in regions where the value of the filter block flag is "0".

Thus, in the same way as with the case of the third embodiment, the loop filter 113 can keep filter processing from being performed at regions where filter processing would locally deteriorate the image quality, thereby further improving the image quality of the reference image.

Note that information relating to the control blocks and filter block flags is added to the encoded data and supplied to the image decoding device 200. Thus, the loop filter 207 of the image decoding device 200 can also perform filter processing in the same way as with the loop filter 113, and can keep filter processing from being performed at regions where filter processing would locally deteriorate the image quality. As a result, the image quality of the decoded image can be further improved.

Fifth Embodiment

[Personal Computer]

The above-described series of processing may be executed by hardware, and may be executed by software. In this case, a configuration may be made as a personal computer such as shown in FIG. 22, for example.

Figure 22:
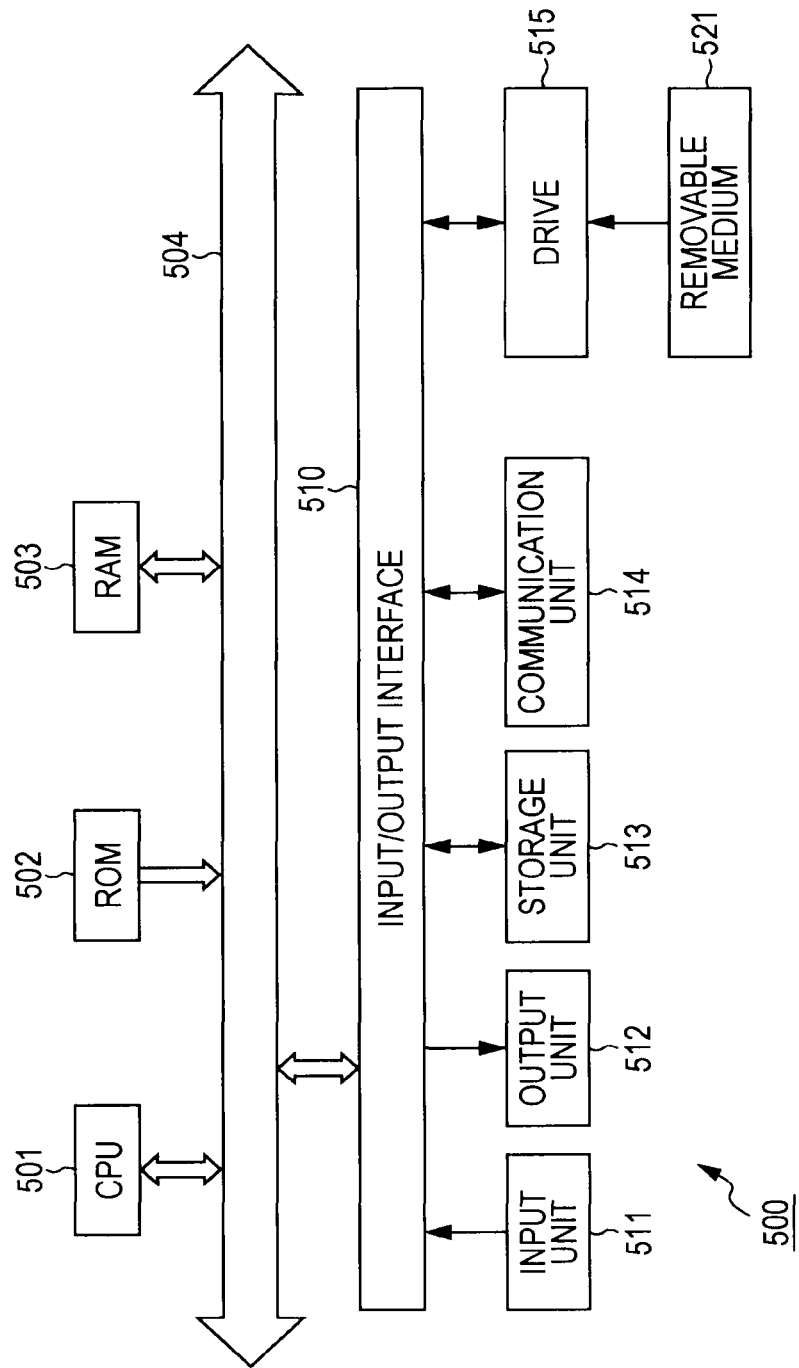
FIG. 22 is a block diagram illustrating a primary configuration example of a personal computer to which the present invention has been applied.

In FIG. 22, a CPU 501 of a personal computer 500 executes various types of processing following programs stored in ROM (Read Only Memory) 502 or programs loaded to RAM (Random Access Memory) 503 from a storage unit 513. The RAM 503 also stores data and so forth necessary for the CPU 501 to execute various types of processing, as appropriate.

The CPU 501, ROM 502, and RAM 503 are mutually connected by a bus 504. This bus 504 is also connected to an input/output interface 510.

Connected to the input/output interface 510 is an input unit 511 made up of a keyboard, a mouse, and so forth, an output unit 512 made up of a display such as a CRT (Cathode Ray Tube) or LCD (Liquid Crystal Display) or the like, a speaker, and so forth, a storage unit 513 made up of a hard disk and so forth, and a communication unit 514 made up of a modem and so forth. The communication unit 514 performs communication processing via networks including the Internet.

Also connected to the input/output interface 510 is a drive 515 as necessary, to which a removable medium 521 such as a magnetic disk, an optical disc, a magneto-optical disk, semiconductor memory, or the like, is mounted as appropriate, and computer programs read out therefrom are installed in the storage unit 513 as necessary.

In the event of executing the above-described series of processing by software, a program configuring the software is installed from a network or recording medium.

As shown in FIG. 22, for example, this recording medium is not only configured of a removable medium 521 made up of a magnetic disk (including flexible disk), optical disc (including CD-ROM (Compact Disc-Read Only Memory), DVD (Digital Versatile Disc), magneto-optical disc (MD (Mini Disc)), or semiconductor memory or the like, in which programs are recorded and distributed so as to distribute programs to users separately from the device main unit, but also is configured of ROM 502, a hard disk included in the storage unit 513, and so forth, in which programs are recorded, distributed to users in a state of having been built into the device main unit beforehand.

Note that a program which the computer executes may be a program in which processing is performed in time sequence following the order described in the present Specification, or may be a program in which processing is performed in parallel, or at a necessary timing, such as when a call-up has been performed.

Also, with the present Specification, steps describing programs recorded in the recording medium includes processing performed in time sequence following the described order as a matter of course, and also processing executed in parallel or individually, without necessarily being processed in time sequence.

Also, with the present specification, the term system represents the entirety of devices configured of multiple devices (devices).

Also, a configuration which has been described above as one device (or processing unit) may be divided and configured as multiple devices (or processing units). Conversely, configurations which have been described above as multiple devices (or processing units) may be integrated and configured as a single device (or processing unit). Also, configurations other than those described above may be added to the devices (or processing units), as a matter of course. Further, part of a configuration of a certain device (or processing unit) may be included in a configuration of another device (or another processing unit), as long as the configuration and operations of the overall system is substantially the same. That is to say, the embodiments of the present invention are not restricted to the above-described embodiments, and that various modifications may be made without departing from the essence of the present invention.

For example, the above-described image encoding device 100 and image decoding device 200 may be applied to image various electronic devices. The following is a description of examples thereof.

Sixth Embodiment

[Television Receiver]

Figure 23:
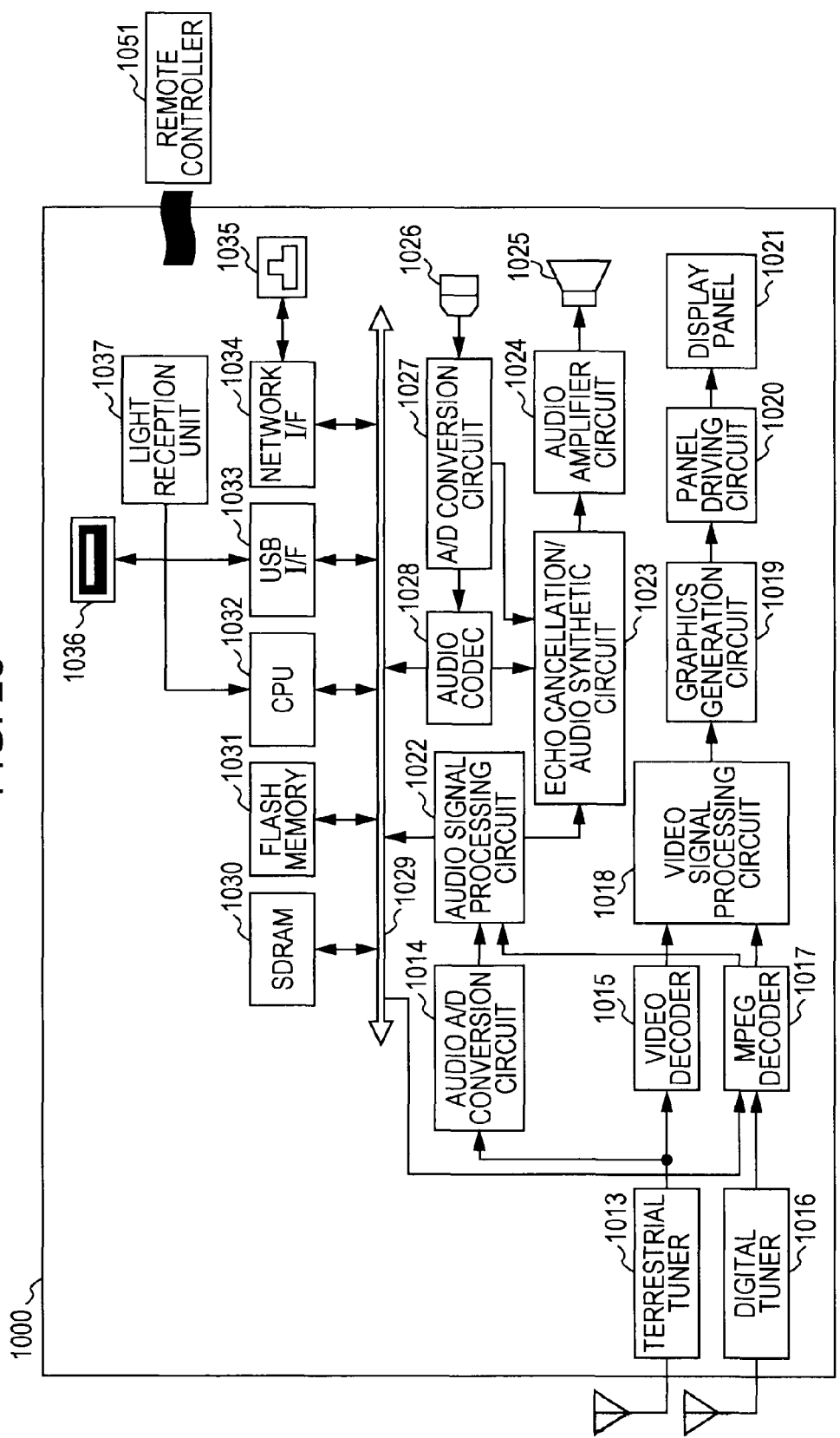
FIG. 23 is a block diagram illustrating a principal configuration example of a television receiver to which the present invention has been applied.

FIG. 23 is a block diagram illustrating a principal configuration example of a television receiver using the image decoding device 200 to which the present invention has been applied.

A television receiver 1000 shown in FIG. 23 includes a terrestrial tuner 1013, a video decoder 1015, a video signal processing circuit 1018, a graphics generating circuit 1019, a panel driving circuit 1020, and a display panel 1021.

The terrestrial tuner 1013 receives the broadcast wave signals of a terrestrial analog broadcast via an antenna, demodulates, obtains video signals, and supplies these to the video decoder 1015. The video decoder 1015 subjects the video signals supplied from the terrestrial tuner 1013 to decoding processing, and supplies the obtained digital component signals to the video signal processing circuit 1018.

The video signal processing circuit 1018 subjects the video data supplied from the video decoder 1015 to predetermined processing such as noise removal or the like, and supplies the obtained video data to the graphics generating circuit 1019.

The graphics generating circuit 1019 generates the video data of a program to be displayed on a display panel 1021, or image data due to processing based on an application to be supplied via a network, or the like, and supplies the generated video data or image data to the panel driving circuit 1020. Also, the graphics generating circuit 1019 also performs processing such as supplying video data obtained by generating video data (graphics) for the user displaying a screen used for selection of an item or the like, and superimposing this on the video data of a program, to the panel driving circuit 1020 as appropriate.

The panel driving circuit 1020 drives the display panel 1021 based on the data supplied from the graphics generating circuit 1019 to display the video of a program, or the above-mentioned various screens on the display panel 1021.

The display panel 1021 is made up of an LCD (Liquid Crystal Display) and so forth, and displays the video of a program or the like in accordance with the control by the panel driving circuit 1020.

Also, the television receiver 1000 also includes an audio A/D (Analog/Digital) conversion circuit 1014, an audio signal processing circuit 1022, an echo cancellation/audio synthesizing circuit 1023, an audio amplifier circuit 1024, and a speaker 1025.

The terrestrial tuner 1013 demodulates the received broadcast wave signal, thereby obtaining not only a video signal but also an audio signal. The terrestrial tuner 1013 supplies the obtained audio signal to the audio A/D conversion circuit 1014.

The audio A/D conversion circuit 1014 subjects the audio signal supplied from the terrestrial tuner 1013 to A/D conversion processing, and supplies the obtained digital audio signal to the audio signal processing circuit 1022.

The audio signal processing circuit 1022 subjects the audio data supplied from the audio A/D conversion circuit 1014 to predetermined processing such as noise removal or the like, and supplies the obtained audio data to the echo cancellation/audio synthesizing circuit 1023.

The echo cancellation/audio synthesizing circuit 1023 supplies the audio data supplied from the audio signal processing circuit 1022 to the audio amplifier circuit 1024.

The audio amplifier circuit 1024 subjects the audio data supplied from the echo cancellation/audio synthesizing circuit 1023 to D/A conversion processing, subjects to amplifier processing to adjust to predetermined volume, and then outputs the audio from the speaker 1025.

Further, the television receiver 1000 also includes a digital tuner 1016, and an MPEG decoder 1017.

The digital tuner 1016 receives the broadcast wave signals of a digital broadcast (terrestrial digital broadcast, BS (Broadcasting Satellite)/CS (Communications Satellite) digital broadcast) via the antenna, demodulates to obtain MPEG-TS (Moving Picture Experts Group-Transport Stream), and supplies this to the MPEG decoder 1017.

The MPEG decoder 1017 descrambles the scrambling given to the MPEG-TS supplied from the digital tuner 1016, and extracts a stream including the data of a program serving as a playing object (viewing object). The MPEG decoder 1017 decodes an audio packet making up the extracted stream, supplies the obtained audio data to the audio signal processing circuit 1022, and also decodes a video packet making up the stream, and supplies the obtained video data to the video signal processing circuit 1018. Also, the MPEG decoder 1017 supplies EPG (Electronic Program Guide) data extracted from the MPEG-TS to a CPU 1032 via an unshown path.

The television receiver 1000 uses the above-mentioned image decoding device 200 as the MPEG decoder 1017 for decoding video packets in this way. Note that the MPEG-TS transmitted from the broadcasting station or the like has been encoded by the image encoding device 100.

The MPEG decoder 1017 performs filter processing on the macroblocks of the decoded image corresponding to the orthogonal transform size thereof, using a filter coefficient extracted from the encoded data supplied from the image encoding device 100, in the same way as with the image decoding device 200. Accordingly, the MPEG decoder 1017 can perform noise removable appropriate for local nature within the image.

The video data supplied from the MPEG decoder 1017 is, in the same way as with the case of the video data supplied from the video decoder 1015, subjected to predetermined processing at the video signal processing circuit 1018, superimposed on the generated video data and so forth at the graphics generating circuit 1019 as appropriate, supplied to the display panel 1021 via the panel driving circuit 1020, and the image thereof is displayed thereon.

The audio data supplied from the MPEG decoder 1017 is, in the same way as with the case of the audio data supplied from the audio A/D conversion circuit 1014, subjected to predetermined processing at the audio signal processing circuit 1022, supplied to the audio amplifier circuit 1024 via the echo cancellation/audio synthesizing circuit 1023, and subjected to D/A conversion processing and amplifier processing. As a result thereof, the audio adjusted in predetermined volume is output from the speaker 1025.

Also, the television receiver 1000 also includes a microphone 1026, and an A/D conversion circuit 1027.

The A/D conversion circuit 1027 receives the user's audio signals collected by the microphone 1026 provided to the television receiver 1000 serving as for audio conversation, subjects the received audio signal to A/D conversion processing, and supplies the obtained digital audio data to the echo cancellation/audio synthesizing circuit 1023.

In the event that the user (user A)'s audio data of the television receiver 1000 has been supplied from the A/D conversion circuit 1027, the echo cancellation/audio synthesizing circuit 1023 perform echo cancellation with the user (user A)'s audio data taken as a object, and outputs audio data obtained by synthesizing the user A's audio data and other audio data, or the like from the speaker 1025 via the audio amplifier circuit 1024.

Further, the television receiver 1000 also includes an audio codec 1028, an internal bus 1029, SDRAM (Synchronous Dynamic Random Access Memory) 1030, flash memory 1031, a CPU 1032, a USB (Universal Serial Bus) I/F 1033, and a network I/F 1034.

The A/D conversion circuit 1027 receives the user's audio signal collected by the microphone 1026 provided to the television receiver 1000 serving as for audio conversation, subjects the received audio signal to A/D conversion processing, and supplies the obtained digital audio data to the audio codec 1028.

The audio codec 1028 converts the audio data supplied from the A/D conversion circuit 1027 into the data of a predetermined format for transmission via a network, and supplies to the network I/F 1034 via the internal bus 1029.

The network I/F 1034 is connected to the network via a cable mounted on a network terminal 1035. The network I/F 1034 transmits the audio data supplied from the audio codec 1028 to another device connected to the network thereof, for example. Also, the network I/F 1034 receives, via the network terminal 1035, the audio data transmitted from another device connected thereto via the network, and supplies this to the audio codec 1028 via the internal bus 1029, for example.

The audio codec 1028 converts the audio data supplied from the network I/F 1034 into the data of a predetermined format, and supplies this to the echo cancellation/audio synthesizing circuit 1023.

The echo cancellation/audio synthesizing circuit 1023 performs echo cancellation with the audio data supplied from the audio codec 1028 taken as a object, and outputs the data of audio obtained by synthesizing the audio data and other audio data, or the like, from the speaker 1025 via the audio amplifier circuit 1024.

The SDRAM 1030 stores various types of data necessary for the CPU 1032 performing processing.

The flash memory 1031 stores a program to be executed by the CPU 1032. The program stored in the flash memory 1031 is read out by the CPU 1032 at predetermined timing such as when activating the television receiver 1000, or the like. EPG data obtained via a digital broadcast, data obtained from a predetermined server via the network, and so forth are also stored in the flash memory 1031.

For example, MPEG-TS including the content data obtained from a predetermined server via the network by the control of the CPU 1032 is stored in the flash memory 1031. The flash memory 1031 supplies the MPEG-TS thereof to the MPEG decoder 1017 via the internal bus 1029 by the control of the CPU 1032, for example.

The MPEG decoder 1017 processes the MPEG-TS thereof in the same way as with the case of the MPEG-TS supplied from the digital tuner 1016. In this way, the television receiver 1000 receives the content data made up of video, audio, and so forth via the network, decodes using the MPEG decoder 1017, whereby video thereof can be displayed, and audio thereof can be output.

Also, the television receiver 1000 also includes a light reception unit 1037 for receiving the infrared signal transmitted from a remote controller 1051.

The light reception unit 1037 receives infrared rays from the remote controller 1051, and outputs a control code representing the content of the user's operation obtained by demodulation, to the CPU 1032.

The CPU 1032 executes the program stored in the flash memory 1031 to control the entire operation of the television receiver 1000 according to the control code supplied from the light reception unit 1037, and so forth. The CPU 1032, and the units of the television receiver 1000 are connected via an unshown path.

The USB I/F 1033 performs transmission/reception of data as to an external device of the television receiver 1000 which is connected via a USB cable mounted on a USB terminal 1036. The network I/F 1034 connects to the network via a cable mounted on the network terminal 1035, also performs transmission/reception of data other than audio data as to various devices connected to the network.

The television receiver 1000 can perform noise removal appropriate for local nature within the image by using the image decoding devices as the MPEG decoder 1017. As a result, the television receiver 1000 can obtain higher image quality decoded images from broadcast signals received via an antenna or content data obtained via a network.

Seventh Embodiment

[Cellular Telephone]

Figure 24:
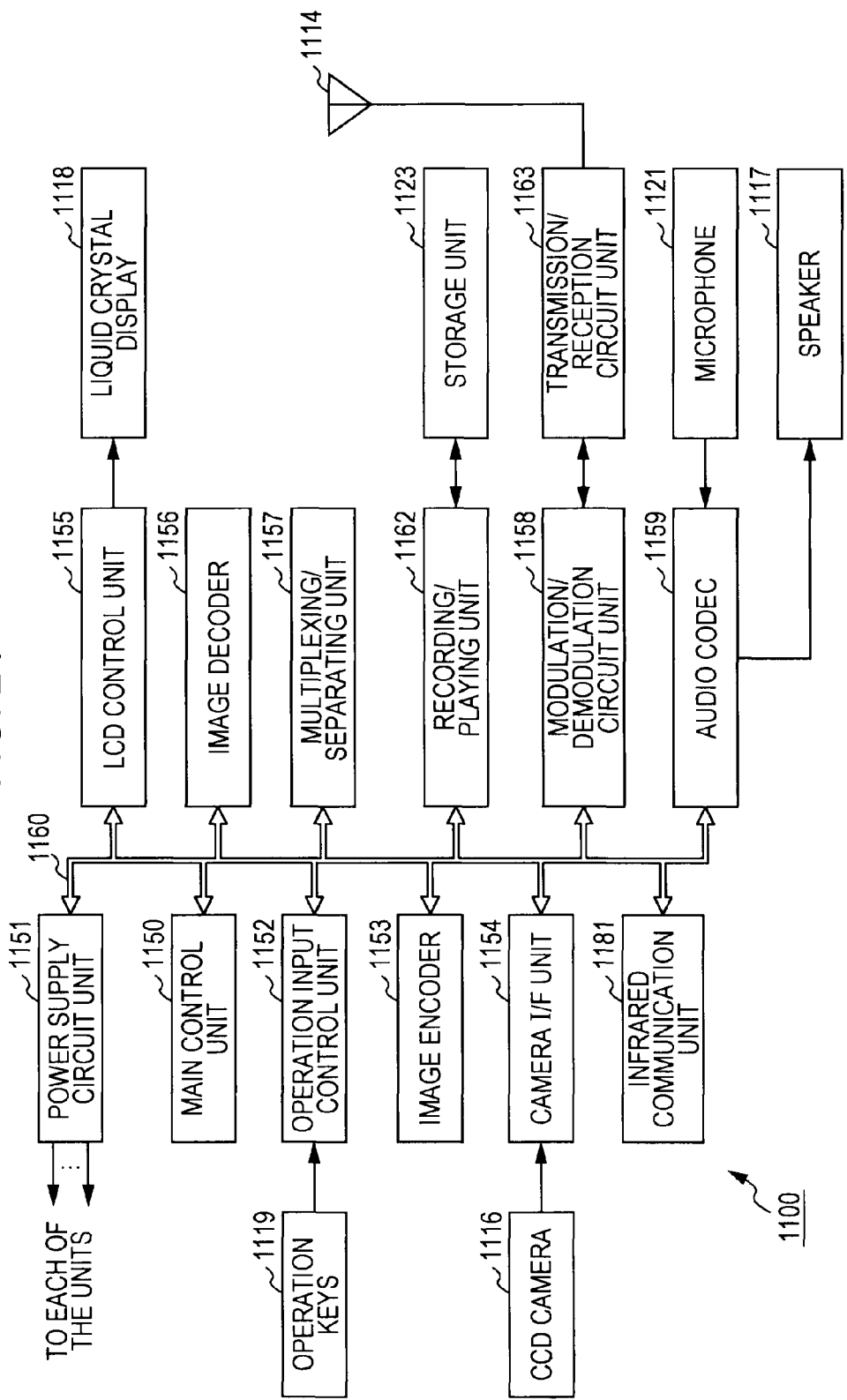
FIG. 24 is a block diagram illustrating a principal configuration example of a cellular telephone to which the present invention has been applied.

FIG. 24 is a block diagram illustrating a principal configuration example of a cellular telephone using the image encoding device and image decoding device to which the present invention has been applied.

A cellular telephone 1100 shown in FIG. 24 includes a main control unit 1150 configured so as to integrally control the units, a power supply circuit unit 1151, an operation input control unit 1152, an image encoder 1153, a camera I/F unit 1154, an LCD control unit 1155, an image decoder 1156, a multiplexing/separating unit 1157, a recording/playing unit 1162, a modulation/demodulation circuit unit 1158, and an audio codec 1159. These are mutually connected via a bus 1160.

Also, the cellular telephone 1100 includes operation keys 1119, a CCD (Charge Coupled Devices) camera 1116, a liquid crystal display 1118, a storage unit 1123, a transmission/reception circuit unit 1163, an antenna 1114, a microphone (MIC) 1121, and a speaker 1117.

Upon a call end and power key being turned on by the user's operation, the power supply circuit unit 1151 activates the cellular telephone 1100 in an operational state by supplying power to the units from a battery pack.

The cellular telephone 1100 performs various operations, such as transmission/reception of an audio signal, transmission/reception of an e-mail and image data, image shooting, data recoding, and so forth, in various modes such as a voice call mode, a data communication mode, and so forth, based on the control of the main control unit 1150 made up of a CPU, ROM, RAM, and so forth.

For example, in the voice call mode, the cellular telephone 1100 converts the audio signal collected by the microphone (mike) 1121 into digital audio data by the audio codec 1159, subjects this to spectrum spread processing at the modulation/demodulation circuit unit 1158, and subjects this to digital/analog conversion processing and frequency conversion processing at the transmission/reception circuit unit 1163. The cellular telephone 1100 transmits the signal for transmission obtained by the conversion processing thereof to an unshown base station via the antenna 1114. The signal for transmission (audio signal) transmitted to the base station is supplied to the cellular telephone of the other party via the public telephone network.

Also, for example, in the voice call mode, the cellular telephone 1100 amplifies the reception signal received at the antenna 1114, at the transmission/reception circuit unit 1163, further subjects to frequency conversion processing and analog/digital conversion processing, subjects to spectrum inverse spread processing at the modulation/demodulation circuit unit 1158, and converts into an analog audio signal by the audio codec 1159. The cellular telephone 1100 outputs the converted and obtained analog audio signal thereof from the speaker 1117.

Further, for example, in the event of transmitting an e-mail in the data communication mode, the cellular telephone 1100 accepts the text data of the e-mail input by the operation of the operation keys 1119 at the operation input control unit 1152. The cellular telephone 1100 processes the text data thereof at the main control unit 1150, and displays on the liquid crystal display 1118 via the LCD control unit 1155 as an image.

Also, the cellular telephone 1100 generates e-mail data at the main control unit 1150 based on the text data accepted by the operation input control unit 1152, the user's instructions, and so forth. The cellular telephone 1100 subjects the e-mail data thereof to spectrum spread processing at the modulation/demodulation circuit unit 1158, and subjects to digital/analog conversion processing and frequency conversion processing at the transmission/reception circuit unit 1163. The cellular telephone 1100 transmits the signal for transmission obtained by the conversion processing thereof to an unshown base station via the antenna 1114. The signal for transmission (e-mail) transmitted to the base station is supplied to a predetermined destination via the network, mail server, and so forth.

Also, for example, in the event of receiving an e-mail in the data communication mode, the cellular telephone 1100 receives the signal transmitted from the base station via the antenna 1114 with the transmission/reception circuit unit 1163, amplifies, and further subjects to frequency conversion processing and analog/digital conversion processing. The cellular telephone 1100 subjects the reception signal thereof to spectrum inverse spread processing at the modulation/demodulation circuit unit 1158 to restore the original e-mail data. The cellular telephone 1100 displays the restored e-mail data on the liquid crystal display 1118 via the LCD control unit 1155.

Note that the cellular telephone 1100 may record (store) the received e-mail data in the storage unit 1123 via the recording/playing unit 1162.

This storage unit 1123 is an optional rewritable recording medium. The storage unit 1123 may be semiconductor memory such as RAM, built-in flash memory, or the like, may be a hard disk, or may be a removable medium such as a magnetic disk, a magneto-optical disk, an optical disc, USB memory, a memory card, or the like. It goes without saying that the storage unit 1123 may be other than these.

Further, for example, in the event of transmitting image data in the data communication mode, the cellular telephone 1100 generates image data by imaging at the CCD camera 1116. The CCD camera 1116 includes a CCD serving as an optical device such as a lens, diaphragm, and so forth, and serving as a photoelectric conversion device, which images a subject, converts the intensity of received light into an electrical signal, and generates the image data of an image of the subject. The CCD camera 1116 performs compression encoding of the image data at the image encoder 1153 via the camera I/F unit 1154, and converts into encoded image data.

The cellular telephone 1100 employs the above-mentioned image encoding device 100 as the image encoder 1153 for performing such processing. Accordingly, in the same way as with the image encoding device 100, the image encoder 1053 can perform noise removal appropriate for local nature within the image.

Note that, at this time simultaneously, the cellular telephone 1100 converts the audio collected at the microphone (mike) 1121, while shooting with the CCD camera 1116, from analog to digital at the audio codec 1159, and further encodes this.

The cellular telephone 1100 multiplexes the encoded image data supplied from the image encoder 1153, and the digital audio data supplied from the audio codec 1159 at the multiplexing/separating unit 1157 using a predetermined method. The cellular telephone 1100 subjects the multiplexed data obtained as a result thereof to spectrum spread processing at the modulation/demodulation circuit unit 1158, and subjects to digital/analog conversion processing and frequency conversion processing at the transmission/reception circuit unit 1163. The cellular telephone 1100 transmits the signal for transmission obtained by the conversion processing thereof to an unshown base station via the antenna 1114. The signal for transmission (image data) transmitted to the base station is supplied to the other party via the network or the like.

Note that in the event that image data is not transmitted, the cellular telephone 1100 may also display the image data generated at the CCD camera 1116 on the liquid crystal display 1118 via the LCD control unit 1155 instead of the image encoder 1153.

Also, for example, in the event of receiving the data of a moving image file linked to a simple website or the like in the data communication mode, the cellular telephone 1100 receives the signal transmitted from the base station at the transmission/reception circuit unit 1163 via the antenna 1114, amplifies, and further subjects to frequency conversion processing and analog/digital conversion processing. The cellular telephone 1100 subjects the received signal to spectrum inverse spread processing at the modulation/demodulation circuit unit 1158 to restore the original multiplexed data. The cellular telephone 1100 separates the multiplexed data thereof at the multiplexing/separating unit 1157 into encoded image data and audio data.

The cellular telephone 1100 decodes the encoded image data at the image decoder 1156, thereby generating playing moving image data, and displays this on the liquid crystal display 1118 via the LCD control unit 1155. Thus, moving image data included in a moving image file linked to a simple website is displayed on the liquid crystal display 1118, for example.

The cellular telephone 1100 employs the above-mentioned image decoding device 200 as the image decoder 1156 for performing such processing. Accordingly, in the same way as with the image decoding device 200, the image decoder 1156 can perform noise removal appropriate for local nature within the image.

At this time, simultaneously, the cellular telephone 1100 converts the digital audio data into an analog audio signal at the audio codec 1159, and outputs this from the speaker 1117. Thus, audio data included in a moving image file linked to a simple website is played, for example.

Note that, in the same way as with the case of e-mail, the cellular telephone 1100 may record (store) the received data linked to a simple website or the like in the storage unit 1123 via the recording/playing unit 1162.

Also, the cellular telephone 1100 analyzes the imaged two-dimensional code obtained by the CCD camera 1116 at the main control unit 1150, whereby information recorded in the two-dimensional code can be obtained.

Further, the cellular telephone 1100 can communicate with an external device at the infrared communication unit 1181 using infrared rays.

The cellular telephone 1100 employs the image encoding device 100 as the image encoder 1153, and this can perform noise removal appropriate for local nature within the image. As a result, the cellular telephone 1100 can obtain a reference image with higher image quality. Thus, the image quality can be made high for decoded images obtained by decoding encoded data generated by encoding image data generated at the CCD camera 1116, for example.

Also, the cellular telephone 1100 employs the image decoding device 200 as the image decoder 1156, and thus can perform noise removal appropriate for local nature within the image. As a result thereof, the cellular telephone 1100 can obtain higher quality decoded images from data (encoded data) of a moving image file linked to at a simple website or the like, for example.

Note that description has been made so far wherein the cellular telephone 1100 employs the CCD camera 1116, but the cellular telephone 1100 may employ an image sensor (CMOS image sensor) using CMOS (Complementary Metal Oxide Semiconductor) instead of this CCD camera 1116. In this case as well, the cellular telephone 1100 can image a subject and generate the image data of an image of the subject in the same way as with the case of employing the CCD camera 1116.

Also, description has been made so far regarding the cellular telephone 1100, but the image encoding device 100 and the image decoding device 200 may be applied to any kind of device in the same way as with the case of the cellular telephone 1100 as long as it is a device having the same imaging function and communication function as those of the cellular telephone 1100, for example, such as a PDA (Personal Digital Assistants), smart phone, UMPC (Ultra Mobile Personal Computer), net book, notebook-sized personal computer, or the like.

Eighth Embodiment

[Hard Disk Recorder]

Figure 25:
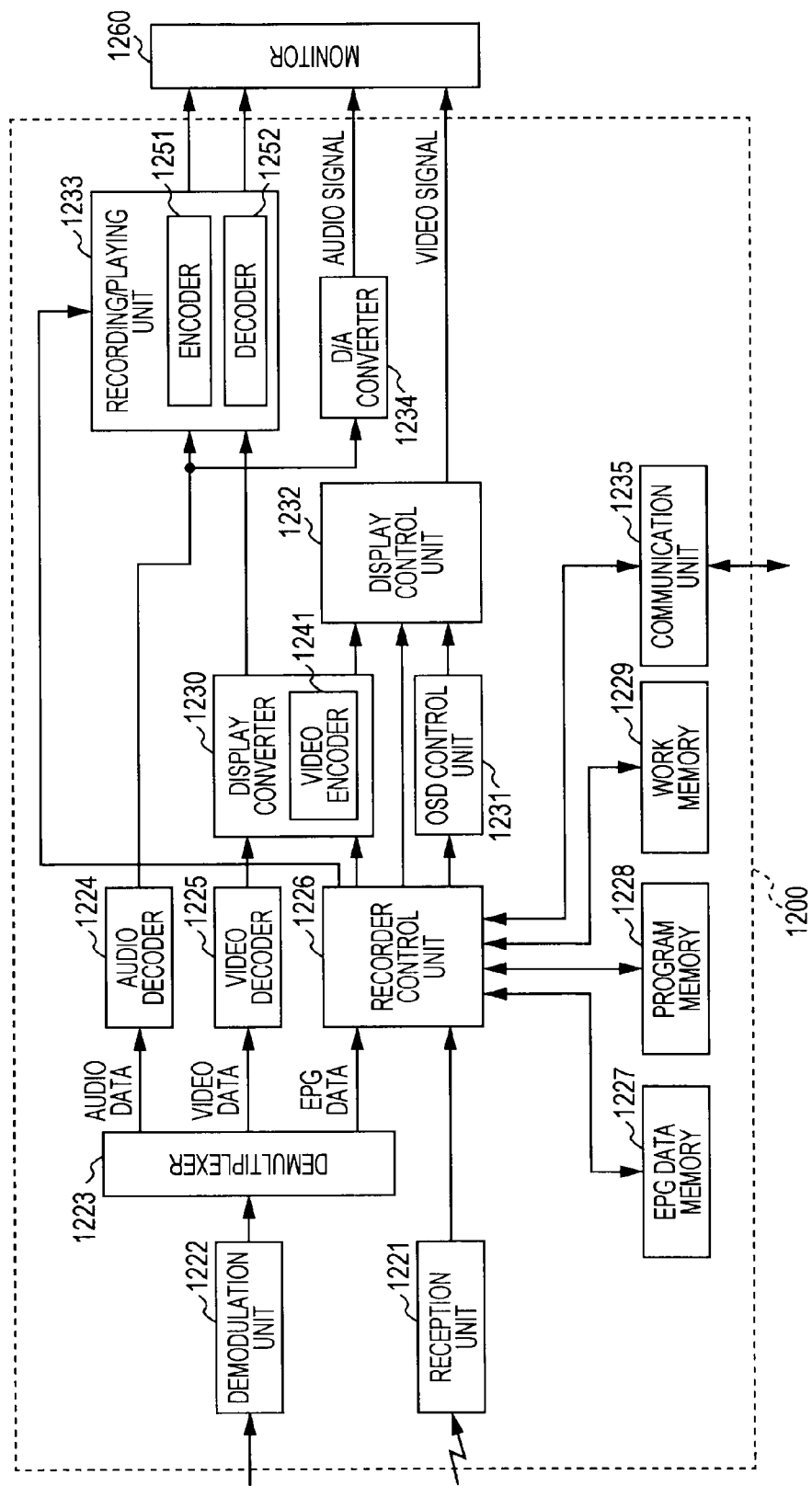
FIG. 25 is a block diagram illustrating a principal configuration example of a hard disk recorder to which the present invention has been applied.

FIG. 25 is a block diagram illustrating a principal configuration example of a hard disk recorder which employs the image encoding device and image decoding device to which the present invention has been applied.

A hard disk recorder (HDD recorder) 1200 shown in FIG. 25 is a device which stores, in a built-in hard disk, audio data and video data of a broadcast program included in broadcast wave signals (television signals) received by a tuner and transmitted from a satellite or a terrestrial antenna or the like, and provides the stored data to the user at timing according to the user's instructions.

The hard disk recorder 1200 can extract audio data and video data from broadcast wave signals, decode these as appropriate, and store in the built-in hard disk, for example. Also, the hard disk recorder 1200 can also obtain audio data and video data from another device via the network, decode these as appropriate, and store in the built-in hard disk, for example.

Further, the hard disk recorder 1200 can decode audio data and video data recorded in the built-in hard disk, supply this to a monitor 1260, display an image thereof on the screen of the monitor 1260, and output audio thereof from the speaker of the monitor 1260, for example. Also, the hard disk recorder 1200 can decode audio data and video data extracted from broadcast signals obtained via a tuner, or audio data and video data obtained from another device via a network, supply this to the monitor 1260, display an image thereof on the screen of the monitor 1260, and output audio thereof from the speaker of the monitor 1260, for example.

Of course, operations other than these may be performed.

As shown in FIG. 25, the hard disk recorder 1200 includes a reception unit 1221, a demodulation unit 1222, a demultiplexer 1223, an audio decoder 1224, a video decoder 1225, and a recorder control unit 1226. The hard disk recorder 1200 further includes EPG data memory 1227, program memory 1228, work memory 1229, a display converter 1230, an OSD (On Screen Display) control unit 1231, a display control unit 1232, a recording/playing unit 1233, a D/A converter 1234, and a communication unit 1235.

Also, the display converter 1230 includes a video encoder 1241. The recording/playing unit 1233 includes an encoder 1251 and a decoder 1252.

The reception unit 1221 receives the infrared signal from the remote controller (not shown), converts into an electrical signal, and outputs to the recorder control unit 1226. The recorder control unit 1226 is configured of, for example, a microprocessor and so forth, and executes various types of processing in accordance with the program stored in the program memory 1228. At this time, the recorder control unit 1226 uses the work memory 1229 according to need.

The communication unit 1235, which is connected to the network, performs communication processing with another device via the network. For example, the communication unit 1235 is controlled by the recorder control unit 1226 to communicate with a tuner (not shown), and to principally output a channel selection control signal to the tuner.

The demodulation unit 1222 demodulates the signal supplied from the tuner, and outputs to the demultiplexer 1223. The demultiplexer 1223 separates the data supplied from the demodulation unit 1222 into audio data, video data, and EPG data, and outputs to the audio decoder 1224, video decoder 1225, and recorder control unit 1226, respectively.

The audio decoder 1224 decodes the input audio data, and outputs to the recording/playing unit 1233. The video decoder 1225 decodes the input video data, and outputs to the display converter 1230. The recorder control unit 1226 supplies the input EPG data to the EPG data memory 1227 for storing.

The display converter 1230 encodes the video data supplied from the video decoder 1225 or recorder control unit 1226 into, for example, the video data conforming to the NTSC (National Television Standards Committee) format using the video encoder 1241, and outputs to the recording/playing unit 1233. Also, the display converter 1230 converts the size of the screen of the video data supplied from the video decoder 1225 or recorder control unit 1226 into the size corresponding to the size of the monitor 1260, converts the video data of which the screen size has been converted into the video data conforming to the NTSC format using the video encoder 1241, converts into an analog signal, and outputs to the display control unit 1232.

The display control unit 1232 superimposes, under the control of the recorder control unit 1226, the OSD signal output from the OSD (On Screen Display) control unit 1231 on the video signal input from the display converter 1230, and outputs to the display of the monitor 1260 for display.

Also, the audio data output from the audio decoder 1224 has been converted into an analog signal using the D/A converter 1234, and supplied to the monitor 1260. The monitor 1260 outputs this audio signal from a built-in speaker.

The recording/playing unit 1233 includes a hard disk as a recording medium in which video data, audio data, and so forth are recorded.

The recording/playing unit 1233 encodes the audio data supplied from the audio decoder 1224 by the encoder 1251. Also, the recording/playing unit 1233 encodes the video data supplied from the video encoder 1241 of the display converter 1230 by the encoder 1251. The recording/playing unit 1233 synthesizes the encoded data of the audio data thereof, and the encoded data of the video data thereof using the multiplexer. The recording/playing unit 1233 amplifies the synthesized data by channel coding, and writes the data thereof in the hard disk via a recording head.

The recording/playing unit 1233 plays the data recorded in the hard disk via a playing head, amplifies, and separates into audio data and video data using the demultiplexer. The recording/playing unit 1233 decodes the audio data and video data by the decoder 1252 using the MPEG format. The recording/playing unit 1233 converts the decoded audio data from digital to analog, and outputs to the speaker of the monitor 1260. Also, the recording/playing unit 1233 converts the decoded video data from digital to analog, and outputs to the display of the monitor 1260.

The recorder control unit 1226 reads out the latest EPG data from the EPG data memory 1227 based on the user's instructions indicated by the infrared signal from the remote controller which is received via the reception unit 1221, and supplies to the OSD control unit 1231. The OSD control unit 1231 generates image data corresponding to the input EPG data, and outputs to the display control unit 1232. The display control unit 1232 outputs the video data input from the OSD control unit 1231 to the display of the monitor 1260 for display. Thus, EPG (Electronic Program Guide) is displayed on the display of the monitor 1260.

Also, the hard disk recorder 1200 can obtain various types of data such as video data, audio data, EPG data, and so forth supplied from another device via the network such as the Internet or the like.

The communication unit 1235 is controlled by the recorder control unit 1226 to obtain encoded data such as video data, audio data, EPG data, and so forth transmitted from another device via the network, and to supply this to the recorder control unit 1226. The recorder control unit 1226 supplies the encoded data of the obtained video data and audio data to the recording/playing unit 1233, and stores in the hard disk, for example. At this time, the recorder control unit 1226 and recording/playing unit 1233 may perform processing such as re-encoding or the like according to need.

Also, the recorder control unit 1226 decodes the encoded data of the obtained video data and audio data, and supplies the obtained video data to the display converter 1230. The display converter 1230 processes, in the same way as the video data supplied from the video decoder 1225, the video data supplied from the recorder control unit 1226, supplies to the monitor 1260 via the display control unit 1232 for displaying an image thereof.

Alternatively, an arrangement may be made wherein in accordance with this image display, the recorder control unit 1226 supplies the decoded audio data to the monitor 1260 via the D/A converter 1234, and outputs audio thereof from the speaker.

Further, the recorder control unit 1226 decodes the encoded data of the obtained EPG data, and supplies the decoded EPG data to the EPG data memory 1227.

The hard disk recorder 1200 thus configured employs the image decoding device 200 as the video decoder 1225, decoder 1252, and decoder housed in the recorder control unit 1226. Accordingly, in the same way as with the image decoding device 200, the video decoder 1225, decoder 1252, and decoder housed in the recorder control unit 1226 can perform noise removal appropriate for local nature within the image.

Accordingly, the hard disk recorder 1200 can perform noise removal appropriate for local nature within the image. As a result, the hard disk recorder 1200 can obtain higher quality decoded images from video data (encoded data) received via the tuner or communication unit 1235, and video data (encoded data) recorded in the hard disk of the recording/playing unit 1233, for example.

Also, the hard disk recorder 1200 employs the image encoding device 100 as the encoder 1251. Accordingly, in the same way as with the case of the image encoding device 100, the encoder 1251 can perform noise removal appropriate for local nature within the image.

Accordingly, the hard disk recorder 1200 can perform noise removal appropriate for local nature within the image. As a result, the hard disk recorder 1200 can make higher the image quality of decoded images of encoded data recorded in the hard disk, for example.

Note that description has been made so far regarding the hard disk recorder 1200 for recording video data and audio data in the hard disk, but it goes without saying that any kind of recording medium may be employed. For example, even with a recorder to which a recording medium other than a hard disk, such as flash memory, optical disc, video tape, or the like, is applied, the image encoding device 100 and image decoding device 200 can be applied thereto in the same way as with the case of the above hard disk recorder 1200.

Ninth Embodiment

[Camera]

Figure 26:
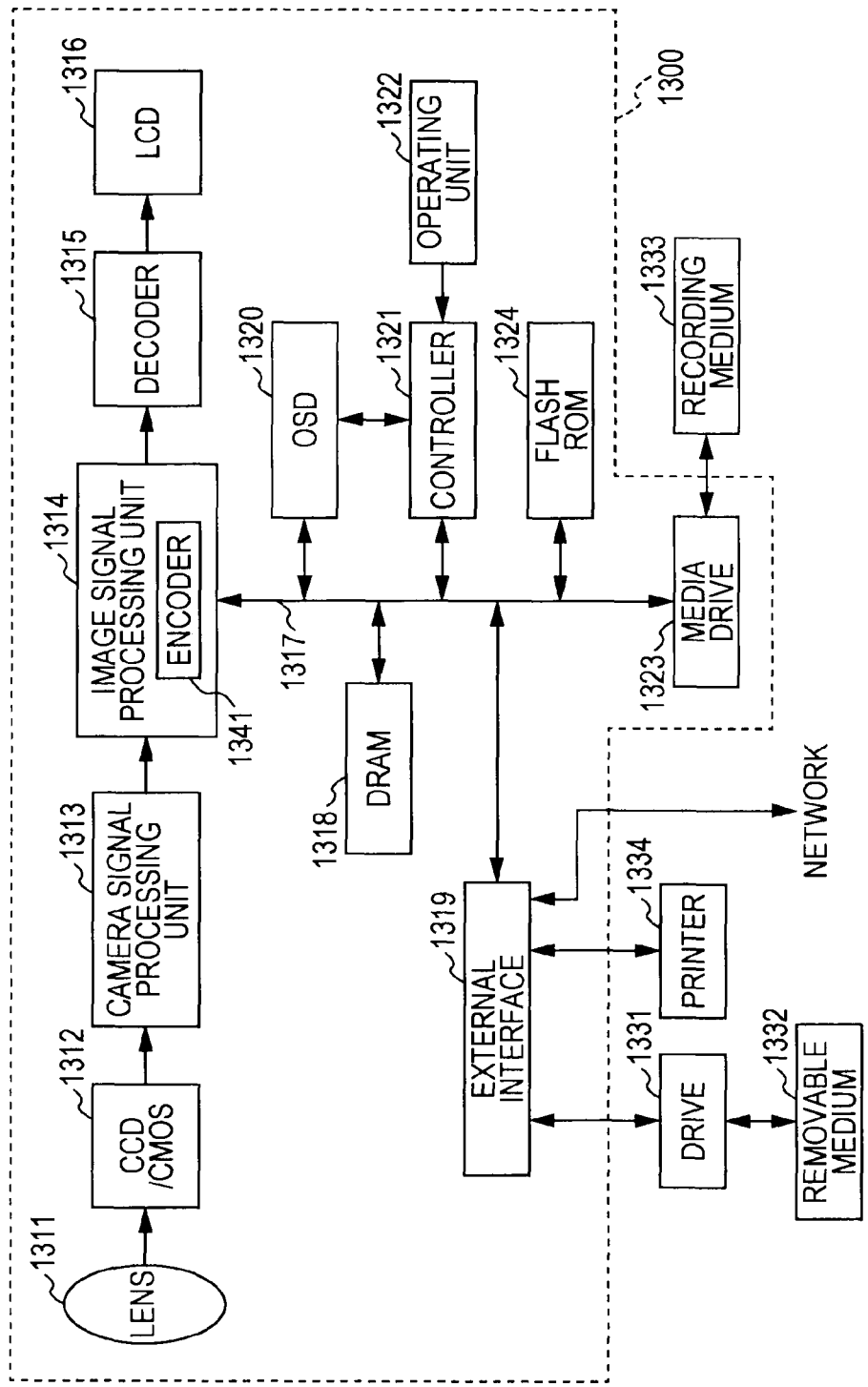
FIG. 26 is a block diagram illustrating a principal configuration example of a camera to which the present invention has been applied.

FIG. 26 is a block diagram illustrating a principal configuration example of a camera employing the image encoding device and image decoding device to which the present invention has been applied.

A camera 1300 shown in FIG. 26 images a subject, displays an image of the subject on an LCD 1316, and records this in a recording medium 1333 as image data.

A lens block 1311 inputs light (i.e., picture of a subject) to a CCD/CMOS 1312. The CCD/CMOS 1312 is an image sensor employing a CCD or CMOS, which converts the intensity of received light into an electrical signal, and supplies to a camera signal processing unit 1313.

The camera signal processing unit 1313 converts the electrical signal supplied from the CCD/CMOS 1312 into color difference signals of Y, Cr, and Cb, and supplies to an image signal processing unit 1314. The image signal processing unit 1314 subjects, under the control of a controller 1321, the image signal supplied from the camera signal processing unit 1313 to predetermined image processing, or encodes the image signal thereof by an encoder 1341 using the MPEG format for example. The image signal processing unit 1314 supplies encoded data generated by encoding an image signal, to a decoder 1315. Further, the image signal processing unit 1314 obtains data for display generated at an on-screen display (OSD) 1320, and supplies this to the decoder 1315.

With the above-mentioned processing, the camera signal processing unit 1313 appropriately takes advantage of DRAM (Dynamic Random Access Memory) 1318 connected via a bus 1317 to hold image data, encoded data encoded from the image data thereof, and so forth in the DRAM 1318 thereof according to need.

The decoder 1315 decodes the encoded data supplied from the image signal processing unit 1314, and supplies obtained image data (decoded image data) to the LCD 1316. Also, the decoder 1315 supplies the data for display supplied from the image signal processing unit 1314 to the LCD 1316. The LCD 1316 synthesizes the image of the decoded image data, and the image of the data for display, supplied from the decoder 1315 as appropriate, and displays a synthesizing image thereof.

The on-screen display 1320 outputs, under the control of the controller 1321, data for display such as a menu screen or icon or the like made up of a symbol, characters, or a figure to the image signal processing unit 1314 via the bus 1317.

Based on a signal indicating the content commanded by the user using an operating unit 1322, the controller 1321 executes various types of processing, and also controls the image signal processing unit 1314, DRAM 1318, external interface 1319, on-screen display 1320, media drive 1323, and so forth via the bus 1317. Programs, data, and so forth necessary for the controller 1321 executing various types of processing are stored in FLASH ROM 1324.

For example, the controller 1321 can encode image data stored in the DRAM 1318, or decode encoded data stored in the DRAM 1318 instead of the image signal processing unit 1314 and decoder 1315. At this time, the controller 1321 may perform encoding and decoding processing using the same format as the encoding and decoding format of the image signal processing unit 1314 and decoder 1315, or may perform encoding/decoding processing using a format that neither the image signal processing unit 1314 nor the decoder 1315 can handle.

Also, for example, in the event that start of image printing has been instructed from the operating unit 1322, the controller 1321 reads out image data from the DRAM 1318, and supplies this to a printer 1334 connected to the external interface 1319 via the bus 1317 for printing.

Further, for example, in the event that image recording has been instructed from the operating unit 1322, the controller 1321 reads out encoded data from the DRAM 1318, and supplies this to a recording medium 1333 mounted on the media drive 1323 via the bus 1317 for storing.

The recording medium 1333 is an optional readable/writable removable medium, for example, such as a magnetic disk, a magneto-optical disk, an optical disc, semiconductor memory, or the like. It goes without saying that the recording medium 1333 is also optional regarding the type of a removable medium, and accordingly may be a tape device, or may be a disc, or may be a memory card. It goes without saying that the recoding medium 1333 may be a non-contact IC card or the like.

Alternatively, the media drive 1323 and the recording medium 1333 may be configured so as to be integrated into a non-transportable recording medium, for example, such as a built-in hard disk drive, SSD (Solid State Drive), or the like.

The external interface 1319 is configured of, for example, a USB input/output terminal and so forth, and is connected to the printer 1334 in the event of performing printing of an image. Also, a drive 1331 is connected to the external interface 1319 according to need, on which the removable medium 1332 such as a magnetic disk, optical disc, or magneto-optical disk is mounted as appropriate, and a computer program read out therefrom is installed in the FLASH ROM 1324 according to need.

Further, the external interface 1319 includes a network interface to be connected to a predetermined network such as a LAN, the Internet, or the like. For example, in accordance with the instructions from the operating unit 1322, the controller 1321 can read out encoded data from the DRAM 1318, and supply this from the external interface 1319 to another device connected via the network. Also, the controller 1321 can obtain, via the external interface 1319, encoded data or image data supplied from another device via the network, and hold this in the DRAM 1318, or supply this to the image signal processing unit 1314.

The camera 1300 thus configured employs the image decoding device 200 as the decoder 1315. Accordingly, in the same way as with the image decoding device 200, the decoder 1315 can perform noise removal appropriate for local nature within the image.

Accordingly, the camera 1300 can perform noise removal appropriate for local nature within the image. As a result, the hard disk recorder 1200 can obtain decoded images with higher image quality from, for example, image data generated at the CCD/CMOS 1312, encoded data of video data read out from the dram 1318 or recording medium 1333, and encoded data of video data obtained via a network.

Also, the camera 1300 employs the image encoding device 100 as the encoder 1341. Accordingly, in the same way as with the case of the image encoding device 100, the encoder 1341 can perform noise removal appropriate for local nature within the image.

Accordingly, the camera 1300 can perform noise removal appropriate for local nature within the image. As a result, the camera 1300 can make higher the image quality of decoded images of encoded data recorded in the DRAM 1318 or recording medium 1333, and of encoded data provided to other devices.

Note that the decoding method of the image decoding device 200 may be applied to the decoding processing which the controller 1321 performs. In the same way, the encoding method of the image encoding device 100 may be applied to the encoding processing which the controller 1321 performs.

Also, the image data which the camera 1300 takes may be moving images or may be still images.

As a matter of course, the image encoding device 100 and image decoding device 200 may be applied to devices or systems other than the above-described devices.

Also, the size of macroblocks is not restricted to 16×16 pixels. Application can be made to macroblocks of various sizes, such as that of 32×32 pixels shown in FIG. 10, for example.

While description has been made above with filter coefficients and the like being multiplexed (described) in the bit stream, filter coefficients and image data (or bit stream) may be transmitted (recorded), for example, besides being multiplexed. A form may be made where the filter coefficients and image data (or bit stream) are linked (added) as well.

Linking (adding) indicates a state in which image data (or bit streams) and filter coefficients are mutually linked (a correlated state), and the physical positional relation is optional. For example, the image data (or bit stream) and filter coefficients may be transmitted over separate transmission paths. Also, the image data (or bit stream) and filter coefficients may each be recorded in separate recording mediums (or in separate recording areas within the same recording medium). Note that the increments in which image data (or bit streams) and filter coefficients are linked are optional, and may be set in increments of encoding processing (one frame, multiple frames, etc.), for example.

REFERENCE SIGNS LIST

100 image encoding device
112 filter coefficient calculating unit
113 loop filter
151 orthogonal transform size buffer
152 decoded image classifying unit
153 input image classifying unit
154 4×4 block coefficient calculating unit
155 8×8 block coefficient calculating unit
161 pixel classifying unit
162 filter unit (4×4)
163 filter unit (8×8)
200 image decoding device
202 lossless decoding unit
204 inverse orthogonal transform unit
207 loop filter
212 intra prediction unit
213 motion prediction/compensation unit
251 pixel classifying unit
252 filter unit (4×4)
253 filter unit (8×8)

The invention claimed is:

1. An image processing method, comprising:
    decoding, with circuitry, encoded data of an image to generate a decoded image; and
    performing filter processing on said decoded image using a number of taps of filter coefficients set based on an orthogonal transform size applied in orthogonal transform processing performed on said decoded image,
    the number of taps of filter coefficients being further set based on at least one flatness measure of said decoded image, and
    the filter coefficients and the number of taps of filter coefficients being set concurrently.

2. The image processing method of claim 1, wherein said filter processing is performed on a block boundary of said decoded image.

3. The image processing method of claim 1, wherein values of said filter coefficients are set based on said orthogonal transform size.

4. The image processing method of claim 1, wherein, in case of a greater said orthogonal transform size, said number of taps of said filter coefficients is set longer, and in case of a smaller said orthogonal transform size, said number of taps of said filter coefficients is set shorter.

5. The image processing method of claim 1, further comprising:
    extracting said filter coefficients from said encoded data.

6. The image processing method of claim 1, further comprising:
    performing inverse quantization and inverse orthogonal transform on said decoded image.

7. The image processing method of claim 1, wherein said filter processing is performed on a partial image of said decoded image.

8. The image processing method of claim 1, wherein said filter processing is performed using a Wiener Filter.

9. An image processing apparatus, comprising:
    circuitry configured to
        decode encoded data of an image to generate a decoded image; and
        perform filter processing on said decoded image using a number of taps of filter coefficients set based on an orthogonal transform size applied in orthogonal transform processing performed on said decoded image, the number of taps of filter coefficients being further set based on at least one flatness measure of said decoded image,
        the filter coefficients and the number of taps of filter coefficients being set concurrently.

10. The image processing apparatus of claim 9, wherein said filter processing unit performs said filter processing on a block boundary of said decoded image.

11. The image processing apparatus of claim 9, wherein said circuitry is further configured to:
    set values of said filter coefficients based on said orthogonal transform size.

12. The image processing apparatus of claim 9, wherein, in case of a greater said orthogonal transform size, said circuitry sets longer number of taps of said filter coefficients, and in case of a smaller said orthogonal transform size, said circuitry sets shorter number of taps of said filter coefficients.

13. The image processing apparatus of claim 9, wherein said circuitry is further configured to extract said filter coefficients from said encoded data.

14. The image processing apparatus of claim 9, wherein said circuitry is further configured to:
perform inverse quantization on said decoded image, and
perform inverse orthogonal transformation on said decoded image on which inverse quantization has been performed.

15. The image processing apparatus of claim 9, wherein said circuitry performs said filter processing on a partial image of said decoded image.

16. The image processing apparatus of claim 9, wherein said circuitry performs said filter processing using a Wiener Filter.

17. The image processing method of claim 1, further comprising:
adjusting said set filter coefficients or a number of taps of said filter coefficients in accordance with a measured quality of the encoded data of said decoded image.

18. The image processing method of claim 1, further comprising:
identifying a filter processing level of the encoded data; and
determining an application of a deblocking filter to said decoded image based on a predetermined threshold value of the filter processing level, the application including applying deblocking filtering to block boundaries and macroblock boundaries, applying deblocking filtering to the macroblock boundaries only, or not applying the deblocking filter.

19. The image processing method of claim 18, further comprising:
adjusting a filter strength based on the identified filter processing level such that weaker filtering is applied to areas of said decoded image where the at least one flatness measure corresponds to a coarse frequency, and stronger filtering is applied to areas of said decoded image where the at least one flatness measure corresponds to a dense frequency.

20. The image processing method of claim 19, wherein said weaker filtering corresponds to reducing the number of taps of filter coefficients and wherein said stronger filtering corresponds to increasing the number of taps of filter coefficients.

* * * * *